US010303166B2

(12) United States Patent
Iagnemma

(10) Patent No.: US 10,303,166 B2
(45) Date of Patent: May 28, 2019

(54) SUPERVISORY CONTROL OF VEHICLES

(71) Applicant: nuTonomy Inc., Cambridge, MA (US)

(72) Inventor: Karl Iagnemma, Cambridge, MA (US)

(73) Assignee: nuTonomy Inc., Boston, MA (US)

( * ) Notice: Subject to any disclaimer, the term of this patent is extended or adjusted under 35 U.S.C. 154(b) by 0 days.

(21) Appl. No.: 15/161,996

(22) Filed: May 23, 2016

(65) Prior Publication Data

US 2017/0336788 A1 Nov. 23, 2017

(51) Int. Cl.
*G01C 21/26* (2006.01)
*G01D 1/00* (2006.01)
(Continued)

(52) U.S. Cl.
CPC .......... *G05D 1/0038* (2013.01); *B60W 30/12* (2013.01); *B60W 30/143* (2013.01); *B60W 30/18163* (2013.01); *B60W 50/14* (2013.01); *G05D 1/0055* (2013.01); *G05D 1/0088* (2013.01); *G05D 1/0246* (2013.01); *B60W 2050/146* (2013.01); *B60W 2710/00* (2013.01); *B60W 2750/40* (2013.01)

(58) Field of Classification Search
CPC .. G05D 1/0038; G05D 1/0055; G05D 1/0246; G05D 1/0088; B60W 50/14; B60W 30/143; B60W 30/12; B60W 30/18163; B60W 2050/146; B60W 2750/40; B60W 2710/00
USPC .......... 701/2, 22, 23, 25, 123; 340/901, 905, 340/435, 992.1
See application file for complete search history.

(56) References Cited

U.S. PATENT DOCUMENTS 5,545,960 A * 8/1996 Ishikawa .............. G05D 1/0255 318/568.12
6,151,539 A 11/2000 Bergholz et al.
(Continued)

FOREIGN PATENT DOCUMENTS

WO WO2014/139821 9/2014
WO WO2015/008032 1/2015
WO 2017205278 11/2017

OTHER PUBLICATIONS

Laser Scanner-Based Navigation for Commercial Vehicles; Roland Stahn; Gerd Heiserich; Andreas Stopp; 2007 IEEE Intelligent Vehicles Symposium; Year: 2007; pp. 969-974, DOI: 10.1109/IVS.2007.4290242.*

(Continued)

*Primary Examiner* — Cuong H Nguyen
(74) *Attorney, Agent, or Firm* — Fish & Richardson P.C.

(57) ABSTRACT

Among other things, a command is received expressing an objective for operation of a vehicle within a denominated travel segment of a planned travel route. The objective spans a time series of (for example, is expressed at a higher or more abstract level than) control inputs that are to be delivered to one or more of the brake, accelerator, steering, or other operational actuator of the vehicle. The command is expressed to cause operation of the vehicle along a selected man-made travel structure of the denominated travel segment. A feasible manner of operation of the vehicle is determined to effect the command. A succession of control inputs is generated to one or more of the brake, accelerator, steering or other operational actuator of the vehicle in accordance with the determined feasible manner of operation.

37 Claims, 17 Drawing Sheets

Figure 1:
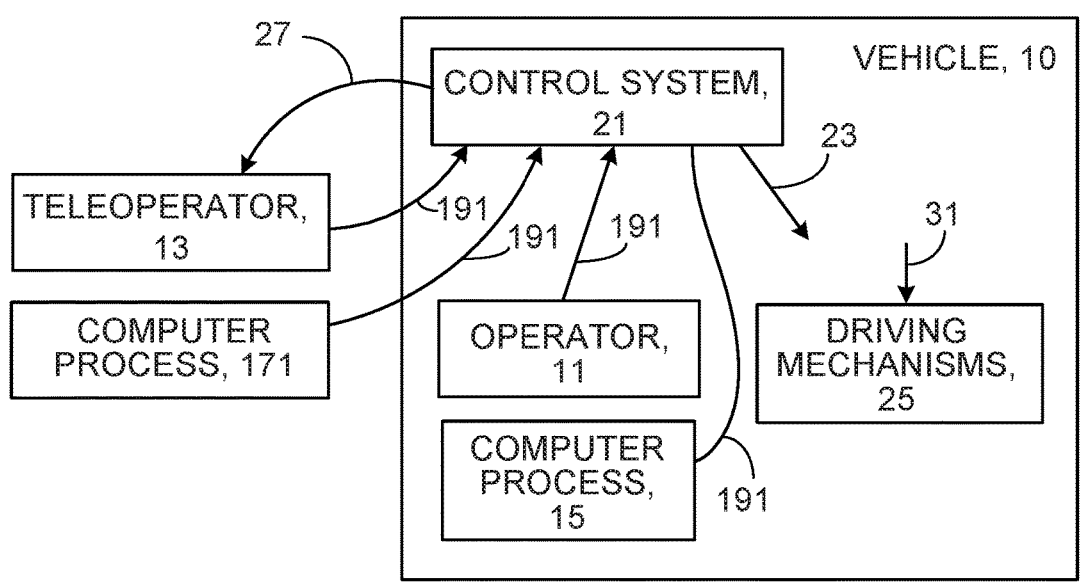

SECOND OF TWO CANDIDATE TRAVEL LANES GENERATED AT TIME k BY LANE IDENTIFICATION PROCESS

BLOCK DIAGRAM OF SYSTEM OPERATION AT TIME k

(51) Int. Cl.
  *G05D 1/00* (2006.01)
  *G05D 1/02* (2006.01)
  *B60W 50/14* (2012.01)
  *B60W 30/14* (2006.01)
  *B60W 30/12* (2006.01)
  *B60W 30/18* (2012.01)

(56) References Cited

U.S. PATENT DOCUMENTS

| | | | |
|---|---|---|---|
| 7,218,212 B2 | 5/2007 | Hu | |
| 7,260,465 B2 | 8/2007 | Waldis et al. | |
| 7,642,931 B2* | 1/2010 | Sato | B60W 50/14 340/436 |
| 8,170,739 B2 | 5/2012 | Lee | |
| 8,229,618 B2 | 6/2012 | Tolstedt et al. | |
| 8,437,890 B2 | 5/2013 | Anderson et al. | |
| 8,543,261 B2* | 9/2013 | Anderson | B60W 30/09 701/3 |
| 8,744,648 B2* | 6/2014 | Anderson | B60W 30/09 701/3 |
| 8,781,715 B2* | 7/2014 | Breed | G07C 5/008 340/905 |
| 8,988,524 B2* | 3/2015 | Smyth | G01P 3/38 348/121 |
| 9,097,549 B1 | 8/2015 | Rao et al. | |
| 9,120,485 B1 | 9/2015 | Dolgov | |
| 9,434,309 B1* | 9/2016 | Smyth | G01P 3/38 |
| 9,568,915 B1* | 2/2017 | Berntorp | G05D 1/0088 |
| 9,904,286 B2* | 2/2018 | Kozak | B60W 30/00 |
| 2006/0103590 A1 | 5/2006 | Divon | |
| 2006/0217939 A1* | 9/2006 | Nakata | G06F 17/18 702/189 |
| 2007/0229310 A1* | 10/2007 | Sato | B60W 50/14 340/995.1 |
| 2010/0228427 A1 | 9/2010 | Anderson et al. | |
| 2012/0083947 A1* | 4/2012 | Anderson | B60W 30/09 701/3 |
| 2012/0109610 A1* | 5/2012 | Anderson | B60W 30/09 703/8 |
| 2013/0338854 A1 | 12/2013 | Yamamoto | |
| 2014/0018994 A1* | 1/2014 | Panzarella | G05D 1/0212 701/25 |
| 2014/0032017 A1* | 1/2014 | Anderson | B60W 30/09 701/3 |
| 2014/0253722 A1* | 9/2014 | Smyth | G01P 3/38 348/135 |
| 2014/0371987 A1 | 12/2014 | Van Wiemeersch | |
| 2015/0012204 A1 | 1/2015 | Breuer et al. | |
| 2015/0088357 A1 | 3/2015 | Yopp | |
| 2015/0292894 A1 | 10/2015 | Goddard et al. | |
| 2015/0345966 A1 | 12/2015 | Meuleau | |
| 2015/0345971 A1 | 12/2015 | Meuleau et al. | |
| 2015/0348112 A1 | 12/2015 | Ramanujam | |
| 2015/0355641 A1 | 12/2015 | Choi et al. | |
| 2016/0016525 A1* | 1/2016 | Chauncey | B60W 50/14 701/123 |
| 2016/0033964 A1 | 2/2016 | Sato et al. | |
| 2016/0075333 A1 | 3/2016 | Sujan et al. | |
| 2016/0139594 A1 | 5/2016 | Okumura et al. | |
| 2016/0236617 A1* | 8/2016 | Smyth | G01P 3/38 |
| 2016/0318530 A1* | 11/2016 | Johnson | B61L 23/04 |
| 2016/0379486 A1* | 12/2016 | Taylor | G08G 1/0141 340/905 |
| 2017/0206464 A1* | 7/2017 | Clayton | G06N 99/005 |

OTHER PUBLICATIONS

Predictive Guidance and Control Framework for (Semi-)Autonomous Vehicles in Public Traffic; Thomas Weiskircher; Qian Wang; Beshah Ayalew; IEEE Transactions on Control Systems Technology; Year: 2017, vol. PP, Issue: 99; pp. 1-13, DOI: 10.1109/TCST.2016.2642164.*

Nonlinear stochastic predictive control with unscented transformation for semi-autonomous vehicles; Changchun Liu; Andrew Gray; Chankyu Lee; J. Karl Hedrick; Jiluan Pan; 2014 American Control Conference; Year: 2014; pp. 5574-5579, DOI: 10.1109/ACC.2014.6859347.*

Robust semi-autonomous vehicle control for roadway departure and obstacle avoidance ; Changchun Liu; Jun Zheng; Jiluan Pan 2013 13th International Conference on Control, Automation and Systems (ICCAS 2013); Year: 2013; pp. 794-799, DOI: 10.1109/ICCAS.2013.6704021.*

Lane-level positioning system based on RFID and vision; C. Zheng; C. Libo; Y. Linbo; Q. Qin; Z. Ruifeng; IET International Conference on Intelligent and Connected Vehicles (ICV 2016); Year: 2016; pp. 1-5, DOI: 10.1049/cp.2016.1172.*

Intelligent traffic with connected vehicles: intelligent and connected traffic systems; Sai Kumar Balabhadruni; 2015 International Conference on Electrical, Electronics, Signals, Communication and Optimization (EESCO); Year: 2015 pp. 1-6, DOI: 10.1109/EESCO.2015.7253926.*

Likelihood-Field-Model-Based Dynamic Vehicle Detection and Tracking for Self-Driving; Tongtong Chen; Ruili Wang; Bin Dai; Daxue Liu; Jinze Song; IEEE Transactions on Intelligent Transportation Systems; Year: 2016, vol. 17, Issue: 11 pp. 3142-3158, DOI: 10.1109/TITS.2016.2542258.*

An Optimization Technique for Positioning Multiple Maps for Self-Driving Car's Autonomous Navigation; Salvador Dominguez; Bodgan Khomutenko; Gaëtan Garcia; Philippe Martinet; 2015 IEEE 18th International Conference on Intelligent Transportation Systems; Year: 2015; pp. 2694-2699, DOI: 10.1109/ITSC.2015.433.*

A Learning Approach Towards Detection and Tracking of Lane Markings; Raghuraman Gopalan et al.; IEEE Transactions on Intelligent Transportation Systems; vol. 13 , Issue: 3; pp. 1088-1098; IEEE Journals & Magazines. year 2012.*

International Search Report and Written Opinion in PCT application PCT/US2017/033811 dated Aug. 3, 2017 (23 pages).

Fong, Terrence, et al., "Advanced Interfaces for Vehicle Teleoperation: Collaborative Control Sensor Fusion Displays, and Remote Driving Tools", Autonomous Robots 11, pp. 77-85, 2001.

Falcone, Paolo, et al., "A Model Predictive Control Approach for Combined Braking and Steering in Autonomous Vehicles", Ford Research Laboratories, Mediterranean Conference on Control & Automation; 2007. [retrieved on May 7, 2017]. Retrieved from the Internet. <URL: http://www.me.berkeley.edu/~frborrel/pdfpub/pub-20.pdf>.

Florentine et al., "Pedestrian notification methods in autonomous vehicles for multi-class mobility-on-demand service." Proceedings of the Fourth International Conference on Human Agent Interaction, Oct. 4, 2016, pp. 387-392.

Pendleton et al., "Autonomous golf cars for public trial of mobility-on-demand service." Intelligent Robots and Systems (IROS), 2015 IEEE/RSJ International Conference on Sep. 28, 2018, pp. 1164-1171.

* cited by examiner

CANDIDATE TRAJECTORY SET GENERATED AT TIME k BY PRUNING PROCESS

FIRST OF TWO CANDIDATE TRAVEL LANES GENERATED AT TIME k
BY LANE IDENTIFICATION PROCESS

SECOND OF TWO CANDIDATE TRAVEL LANES GENERATED AT TIME k
BY LANE IDENTIFICATION PROCESS

SUPERVISORY CONTROL OF VEHICLES

BACKGROUND

This description relates to supervisory control of vehicles.

Human or autonomous driving of vehicles poses risks associated with how the vehicle is driven in light of the state of the vehicle and the state of the environment, including other vehicles and obstacles.

A human driver normally can control a vehicle to proceed safely and reliably to a destination on, for example, a road network shared with other vehicles and pedestrians, while complying with applicable rules of the road. For a self-driving (we sometimes use the term "self-driving" interchangeably with "autonomous") vehicle, a sequence of control actions can be generated based on real-time sensor data, geographic data (such as maps), regulatory and normative data (rules of the road), and historical information (such as traffic patterns).

SUMMARY

In general, in an aspect, a command is received expressing an objective for operation of a vehicle within a denominated travel segment of a planned travel route. The objective spans a time series of (for example, is expressed at a higher or more abstract level than) control inputs that are to be delivered to one or more of the brake, accelerator, steering, or other operational actuator of the vehicle. The command is expressed to cause operation of the vehicle along a selected man-made travel structure of the denominated travel segment. A feasible manner of operation of the vehicle is determined to effect the command. A succession of control inputs is generated to one or more of the brake, accelerator, steering or other operational actuator of the vehicle in accordance with the determined feasible manner of operation. The command is received from a source that is remote from the vehicle.

Implementations may include one or any combination of two or more of the following features. The source includes a teleoperation facility. The source is located in another vehicle. The command is received from a human being or a process or a combination of a human being and a process, e.g., at the remote source. The display of the vehicle and its environment is provided at the remote source to a human operator.

In general, in an aspect, a command is received expressing an objective for operation of a vehicle within a denominated travel segment of a planned travel route. The objective spans a time series of control inputs that are to be delivered to one or more of the brake, accelerator, steering, or other operational actuator of the vehicle. The command is expressed to cause operation of the vehicle along a selected man-made travel structure of the denominated travel segment. A feasible manner of operation of the vehicle is determined to effect the command. A succession of control inputs is generated to one or more of the brake, accelerator, steering or other operational actuator of the vehicle in accordance with the determined feasible manner of operation. The command is received from a human operator at the vehicle in response to a display of available options for alternative objectives.

Implementations may include one or any combination of two or more of the following features. The display includes a video display within the vehicle. The available options are displayed as icons. The available options are displayed on a display that is part of the steering wheel, the center console, or the back of the front seat, or located elsewhere in the vehicle. The available options are displayed on a head up display. The available options are displayed together with a representation of at least one man-made travel structure towards which the vehicle is traveling. The objective includes a travel lane. The objective includes other than a travel lane.

In general, in an aspect, a command is received expressing an objective for operation of a vehicle within a denominated travel segment of a planned travel route. The objective spans a time series of control inputs that are to be delivered to one or more of the brake, accelerator, steering, or other operational actuator of the vehicle. The command is expressed to cause operation of the vehicle along a selected man-made travel structure of the denominated travel segment. A feasible manner of operation of the vehicle is determined to effect the command. A succession of control inputs is generated to one or more of the brake, accelerator, steering or other operational actuator of the vehicle in accordance with the determined feasible manner of operation. The objective includes a maneuver other than a single lane change.

Implementations may include one or any combination of two or more of the following features. The maneuver includes two or more lane changes. The maneuver includes changing speed. The maneuver includes bringing the vehicle to a stop at a place where a stop is permissible. The maneuver includes entering a shoulder of the road. The maneuver includes proceeding on a ramp. The maneuver includes a U-turn. The maneuver includes an emergency stop. The determining of a feasible manner of operation of the vehicle to effect the command includes determining that the manner of operation will not violate a rule of operation of the vehicle.

In general, in an aspect, a command is received expressing an objective for operation of a vehicle within a denominated travel segment of a planned travel route. The objective spans a time series of control inputs that are to be delivered to one or more of the brake, accelerator, steering, or other operational actuator of the vehicle. The command is expressed to cause operation of the vehicle along a selected man-made travel structure of the denominated travel segment. A feasible manner of operation of the vehicle is determined to effect the command. It is confirmed that the feasible manner of operation will not violate a rule of operation of the vehicle. A succession of control inputs is generated to one or more of the brake, accelerator, steering or other operational actuator of the vehicle in accordance with the determined feasible manner of operation.

Implementations may include one or any combination of two or more of the following features. If the feasible manner of operation will violate a rule of operation of the vehicle, the extent of the violation of the rule is minimized or the feasible manner of operation is ruled out entirely or a compromise strategy is applied between enforcing the rules of operation or ignoring them. The objective includes a lane change.

In general, in an aspect, a command is received expressing an objective for operation of a vehicle within a denominated travel segment of a planned travel route. The objective spans a time series of control inputs that are to be delivered to one or more of the brake, accelerator, steering, or other operational actuator of the vehicle. The command is expressed to cause operation of the vehicle along a selected man-made travel structure of the denominated travel segment. A feasible manner of operation of the vehicle is determined to effect the command. A succession of control inputs is generated to one or more of the brake, accelerator, steering or other operational actuator of the vehicle in accordance with the determined feasible manner of operation. The command is received in response to an operator activating a button located in the vehicle.

In general, in an aspect, a command is received expressing an objective for operation of a vehicle within a denominated travel segment of a planned travel route. The objective spans a time series of control inputs that are to be delivered to one or more of the brake, accelerator, steering, or other operational actuator of the vehicle. The command is expressed to cause operation of the vehicle along a selected man-made travel structure of the denominated travel segment. A feasible manner of operation is determined to effect the command. A succession of control inputs is generated to one or more of the brake, accelerator, steering or other operational actuator of the vehicle in accordance with the determined feasible manner of operation. The command is received from a computer process.

Implementations may include one or any combination of two or more of the following features. The computer process is running in a location that is remote from the vehicle. The computer process is running at the vehicle. The denominated travel segment includes a named or numbered highway, road, or street or an identified lane of a highway, road, or street.

In general, in an aspect, a representation is displayed to a human operator or other passenger of a vehicle of a representation of one or more optional objectives for operation of the vehicle within a denominated travel segment of a travel route. The objectives are associated with operation of the vehicle along one or more man-made travel structures of the denominated travel segment. Each of the objectives spans a time series of control inputs that are to be delivered to one or more of the brake, accelerator, steering, or other operational actuator of the vehicle. A selection is received from the human operator or other passenger of one or more of the objectives.

Implementations may include one or any combination of two or more of the following features. The displayed representation includes icons each representing one or more of the optional objectives. The displayed representation includes visual representations of the one or more optional objectives overlaid on a representation of at least a portion of the denominated travel segment. The optional objectives are displayed on a head up display. The optional objectives are displayed on a video display. The optional objectives are displayed on the steering wheel.

Other aspects, implementations, features, and advantages can also be expressed as systems, components, methods, software products, methods of doing business, means and steps for performing functions, and in other ways.

Other aspects, implementations, features, and advantages will become apparent from the following description and the claims.

DESCRIPTION

Figure 2:
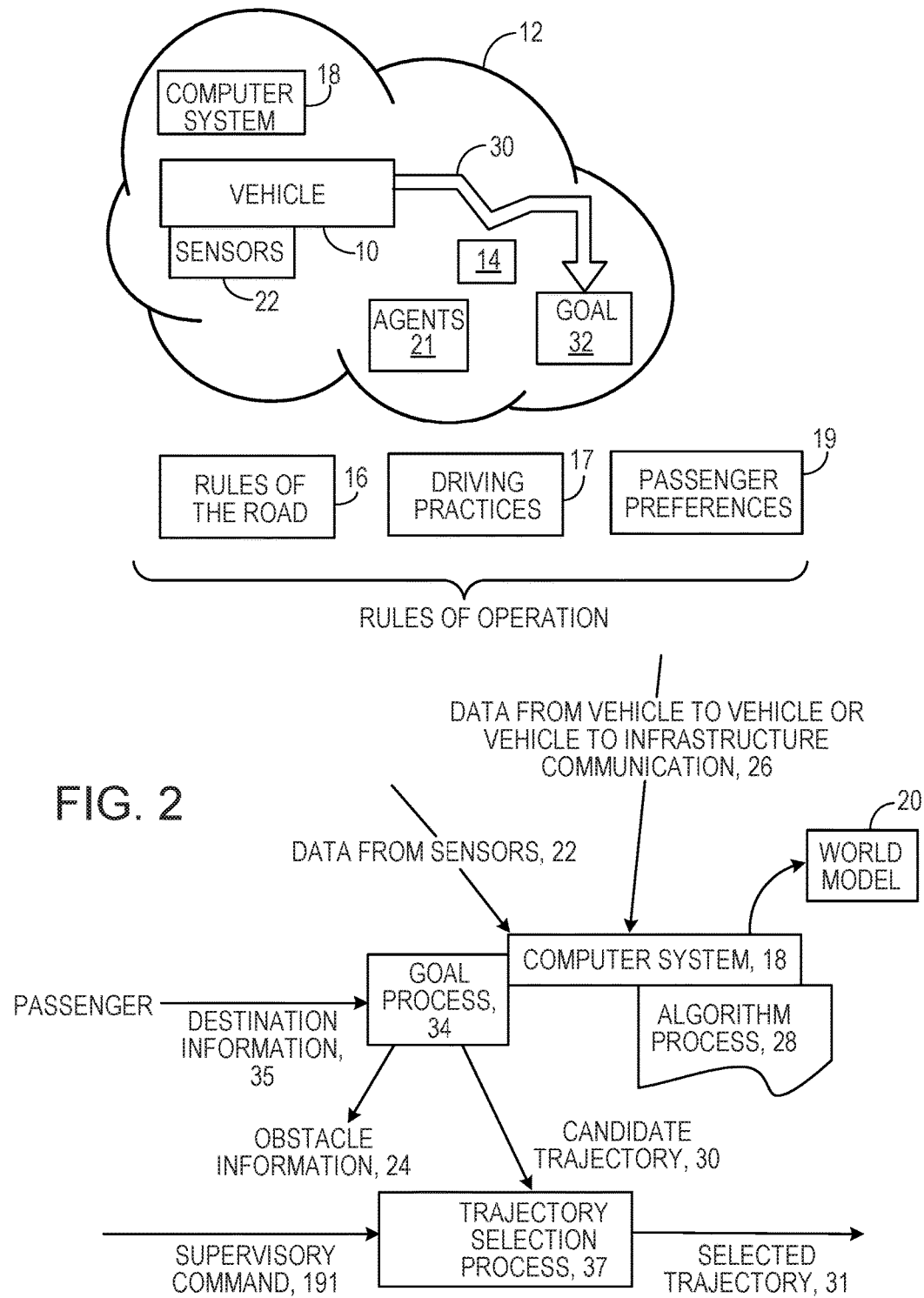
Figure 3:
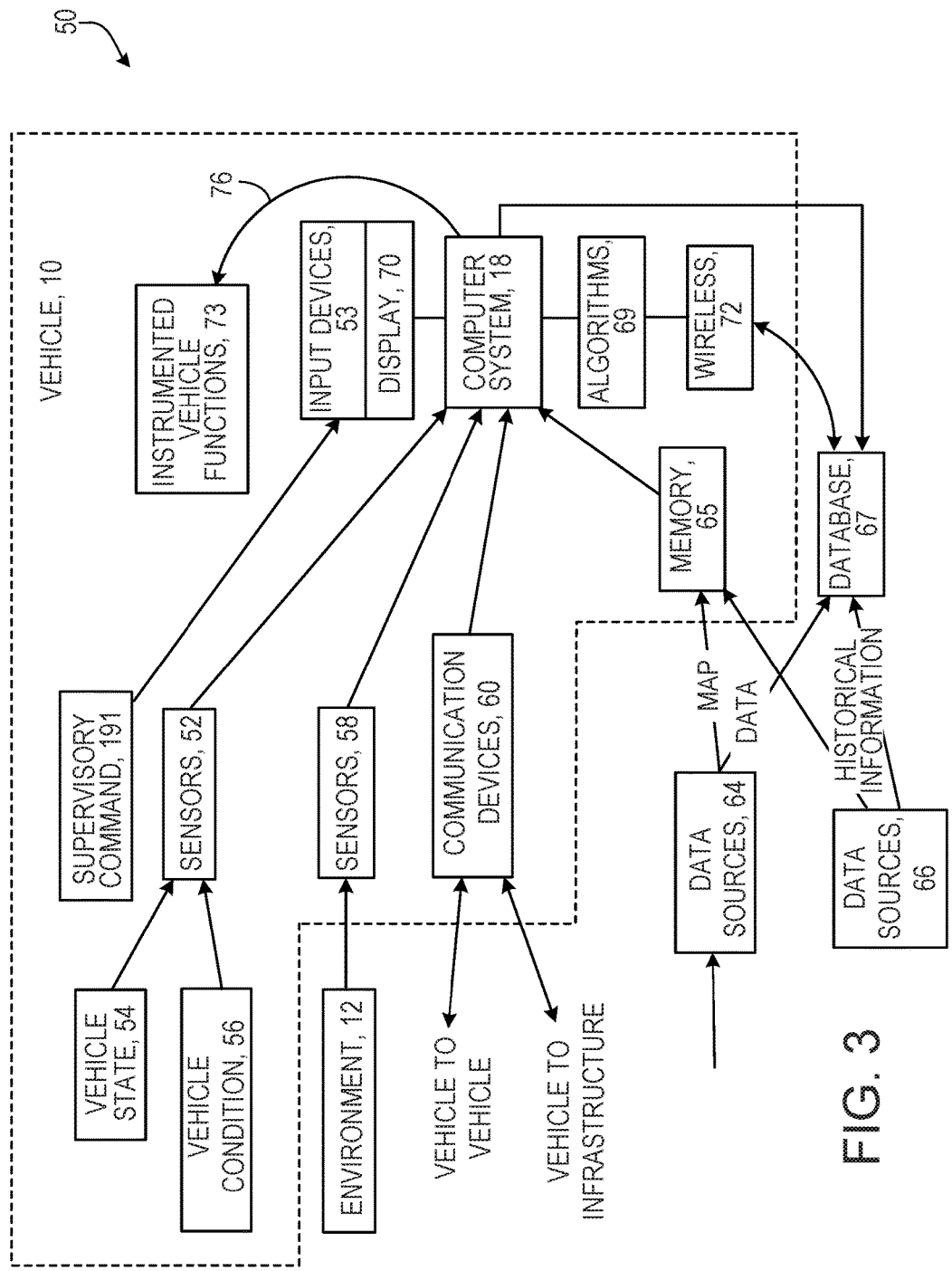
Figure 4:
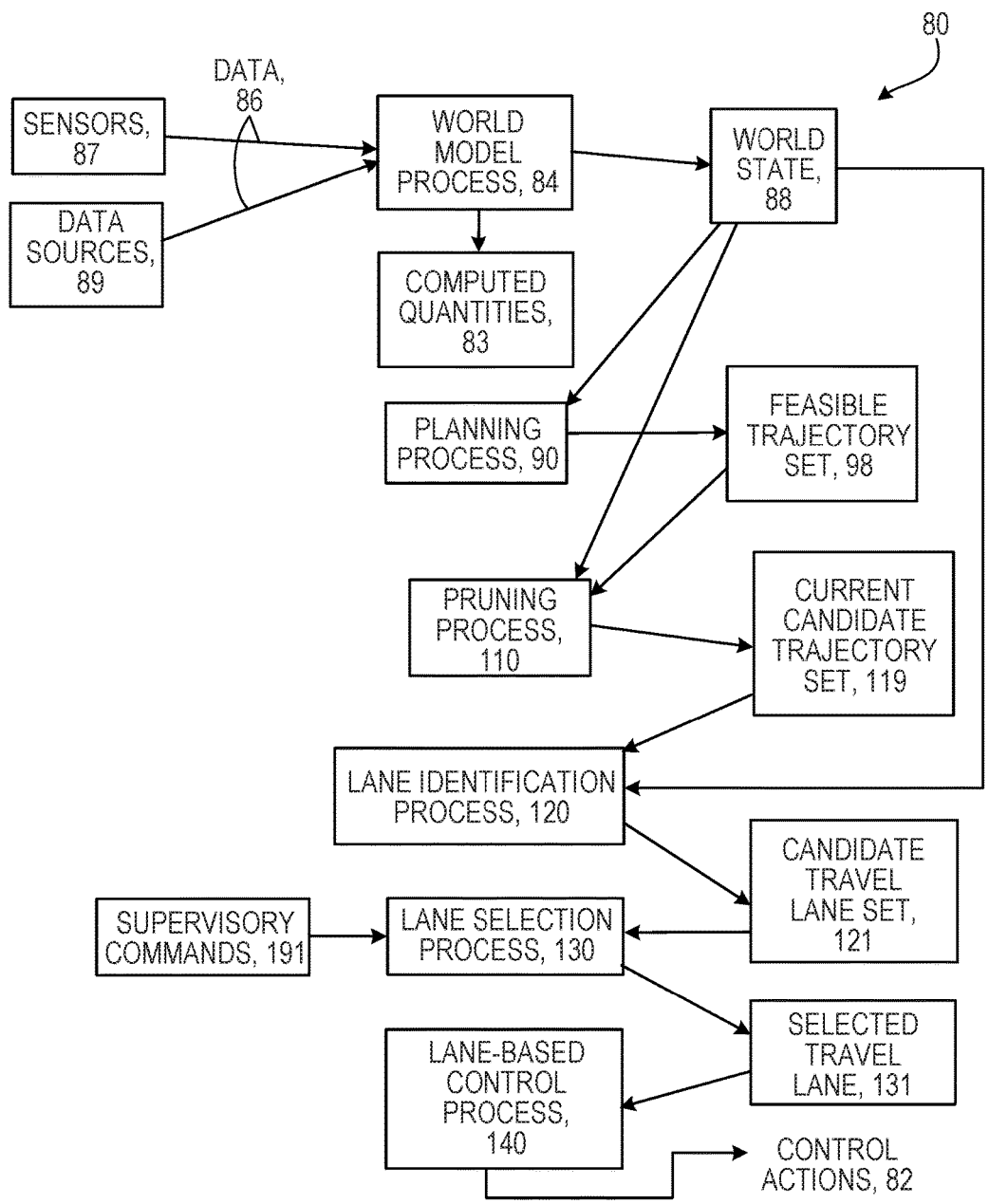
Figure 5:
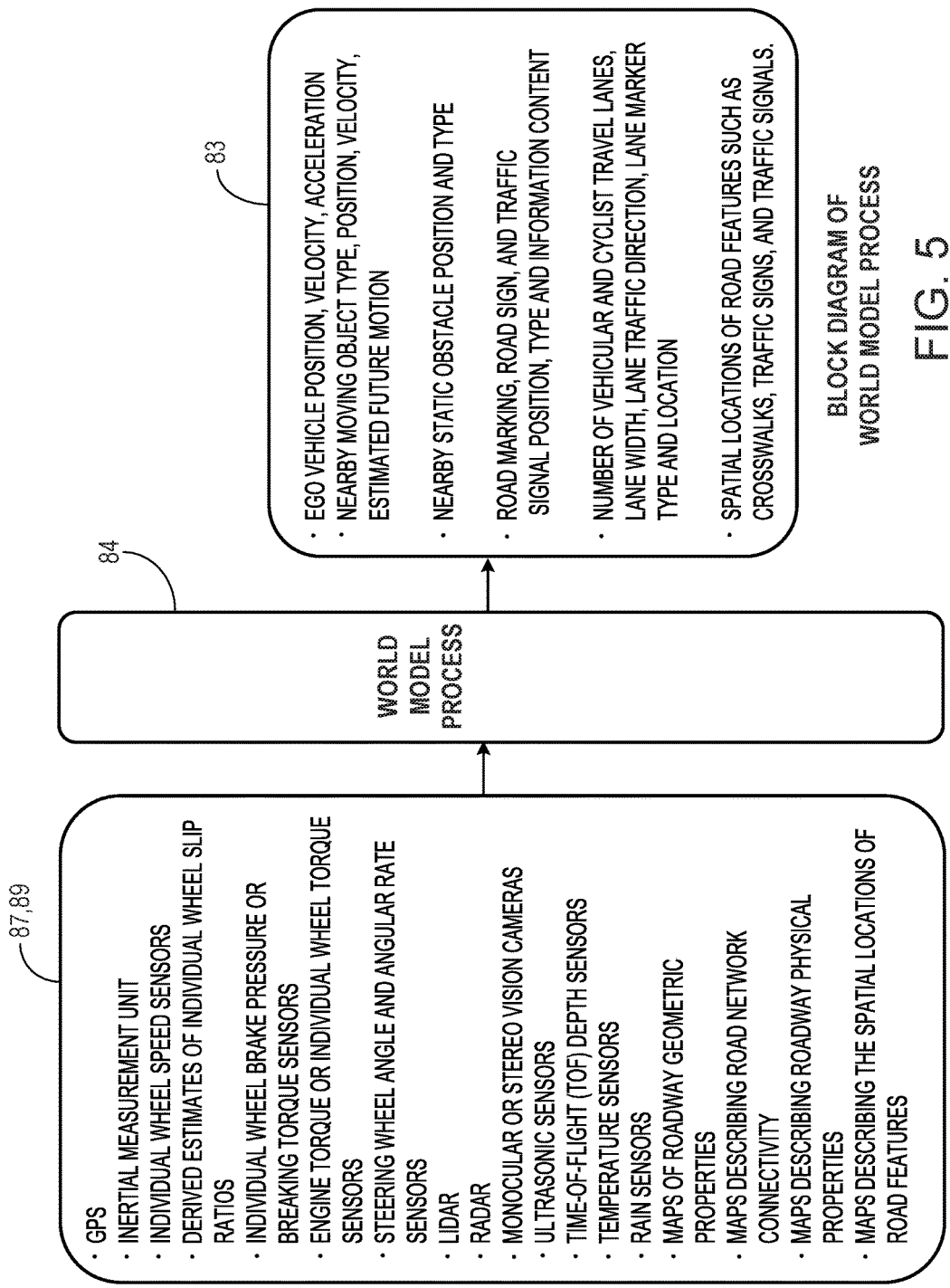
Figure 6:
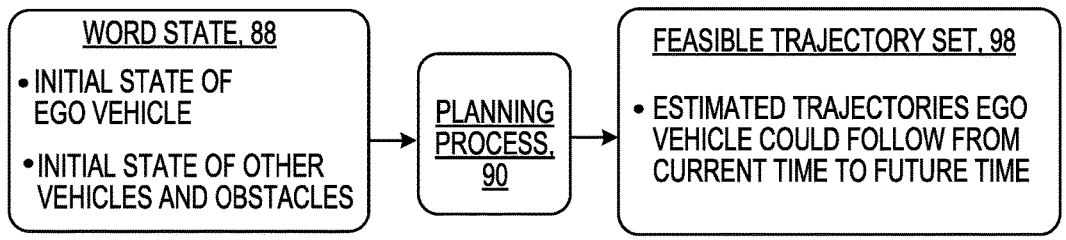
Figure 7:
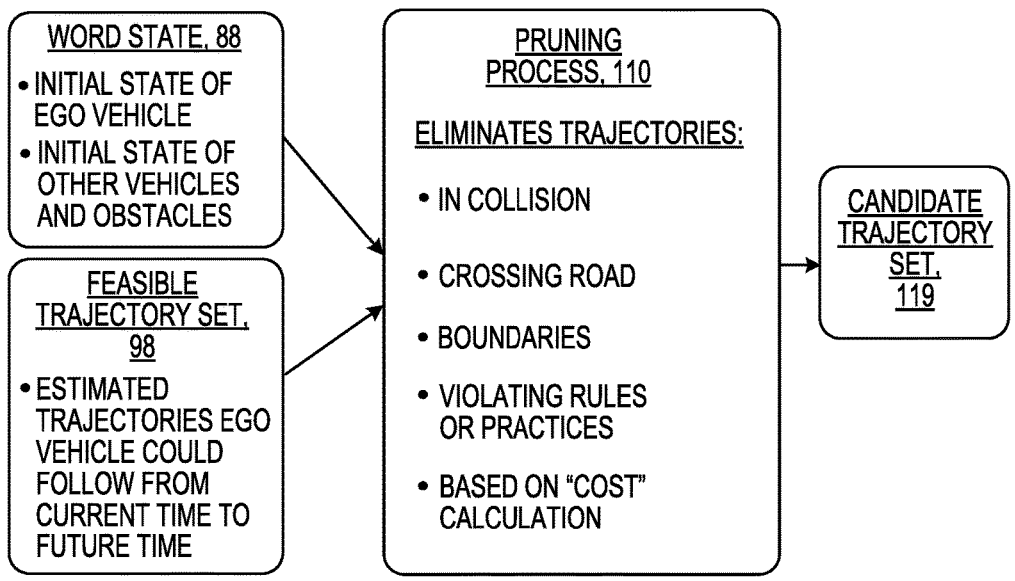
Figure 8:
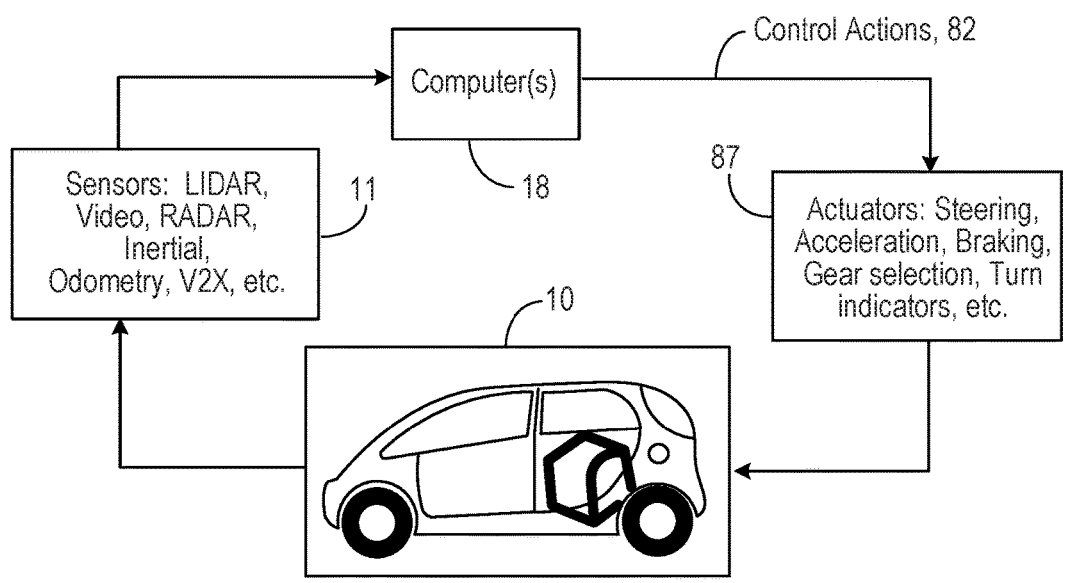
Figure 9:
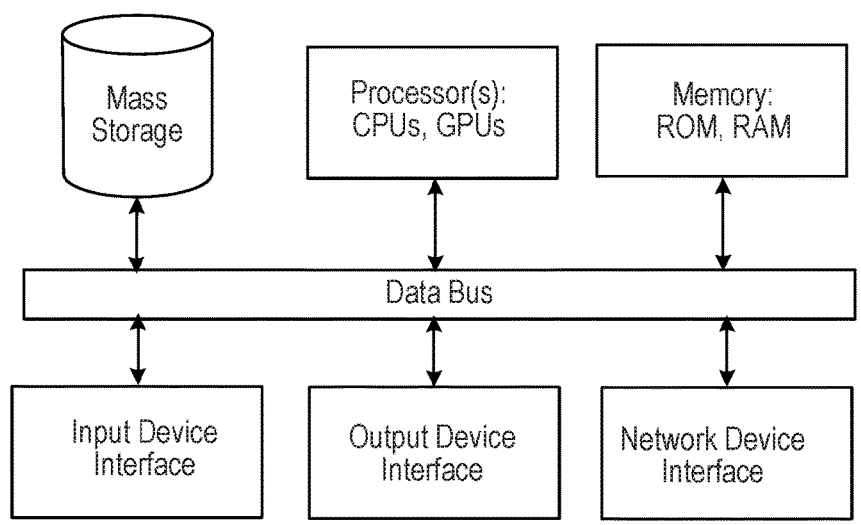
Figure 10:
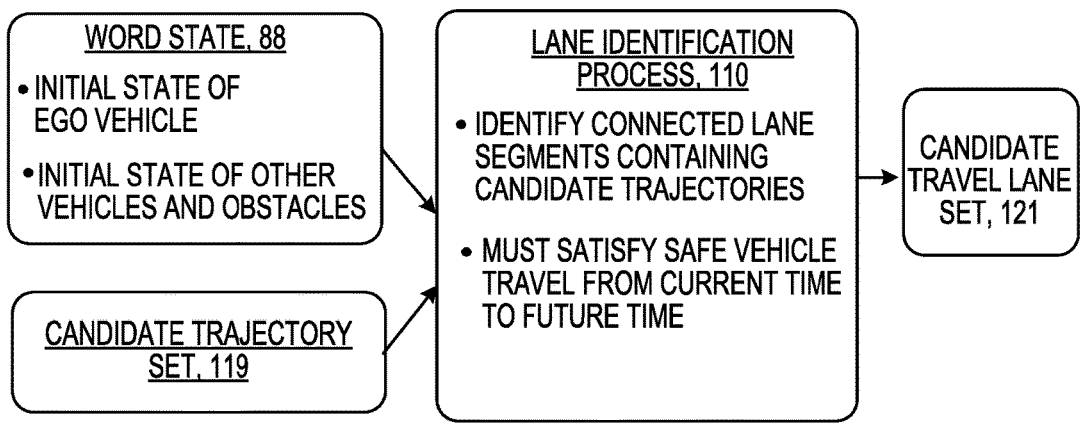
Figure 11:
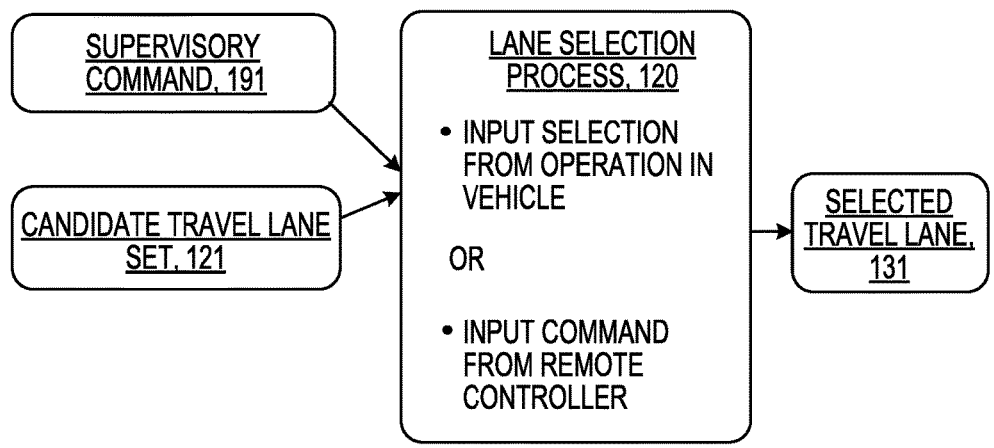
Figure 12:
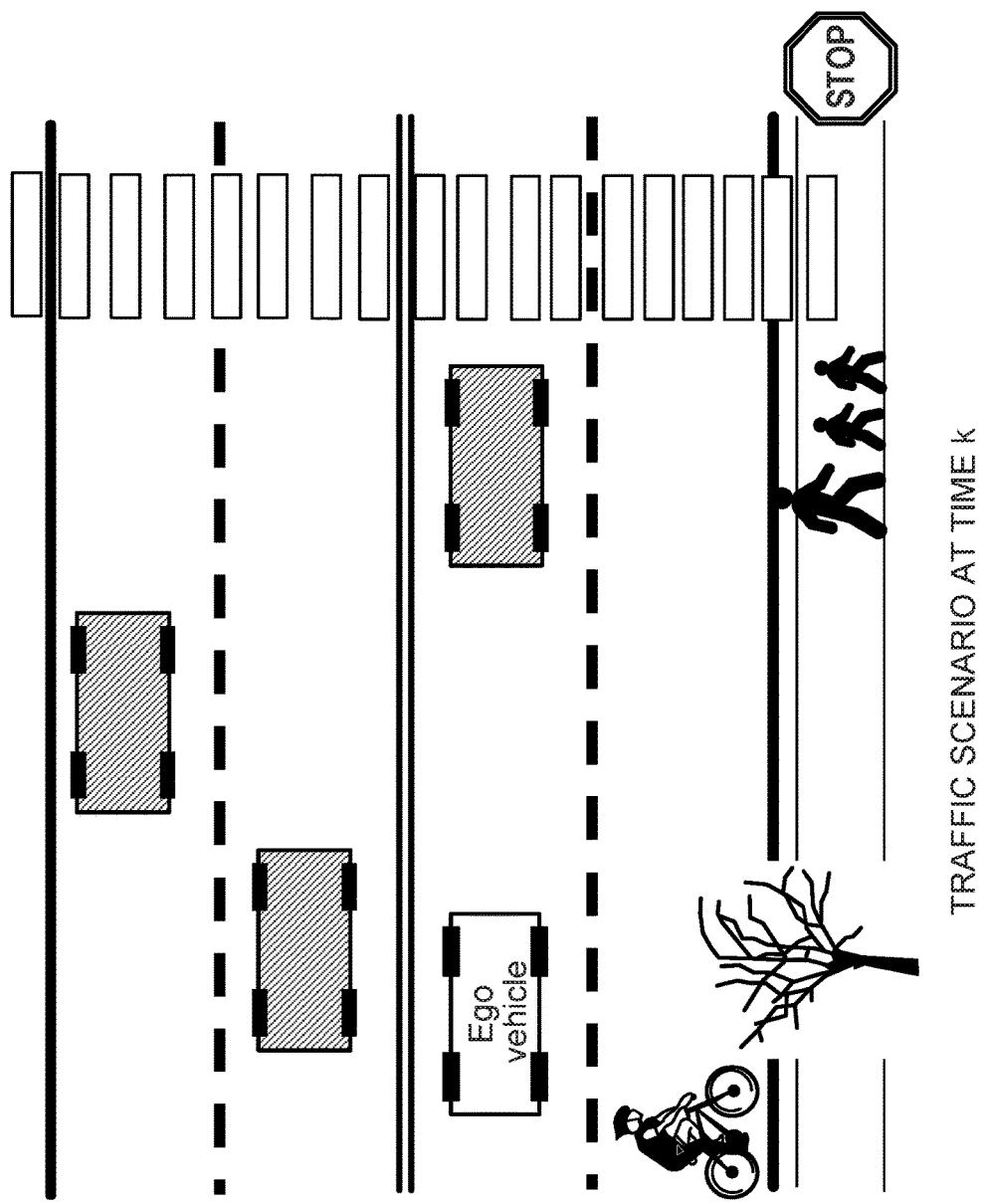
Figure 13:
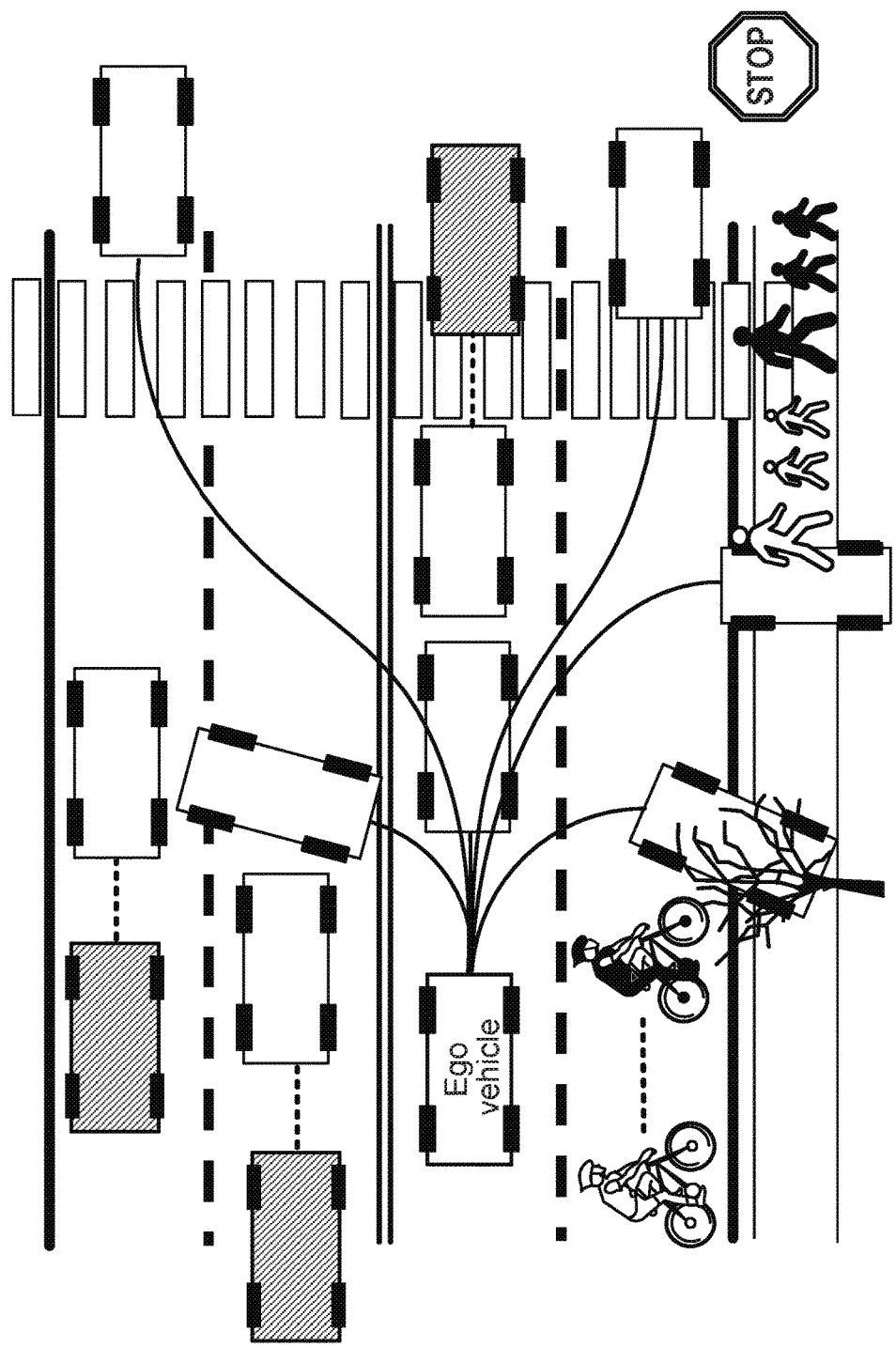
Figure 14:
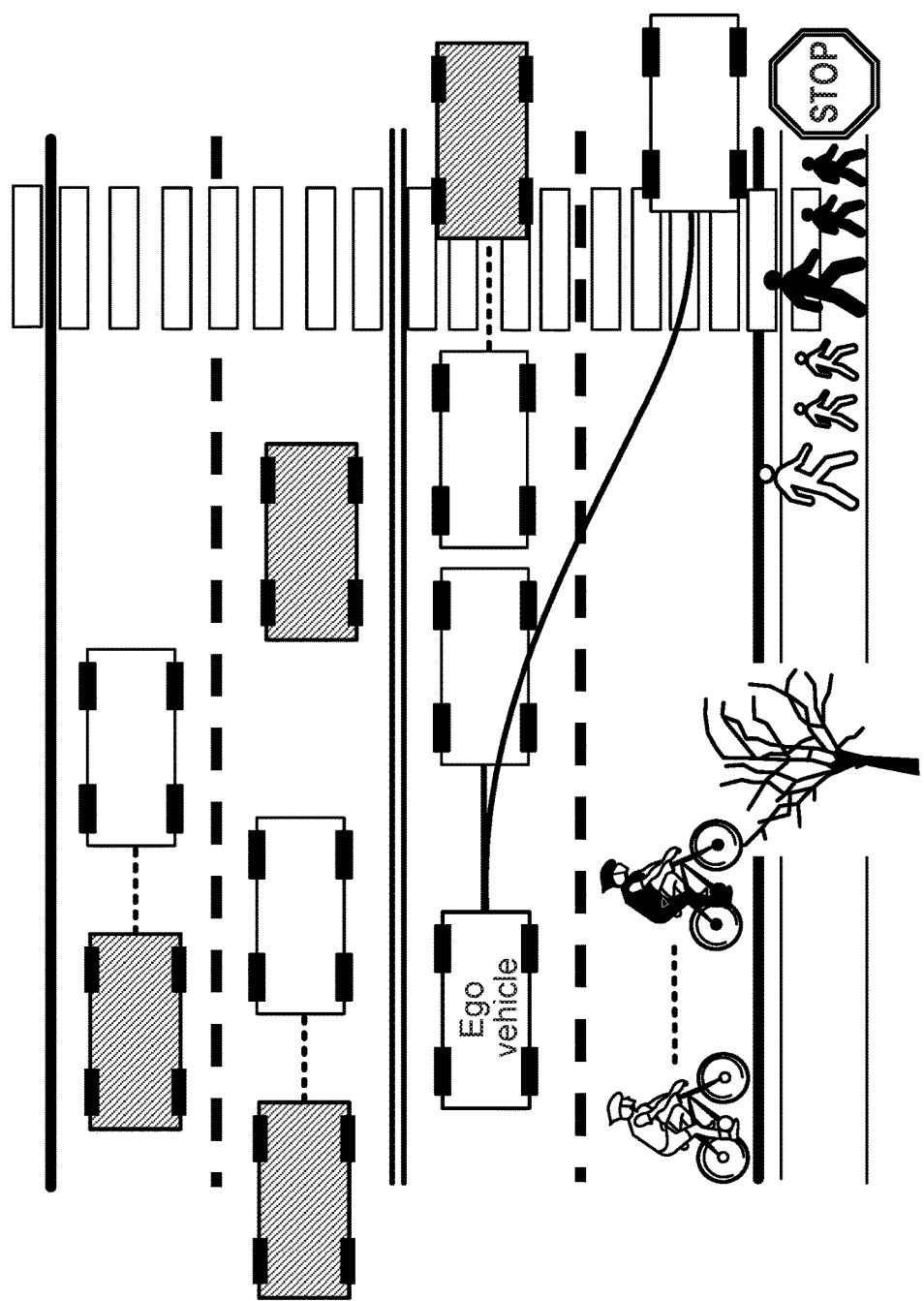
Figure 15:
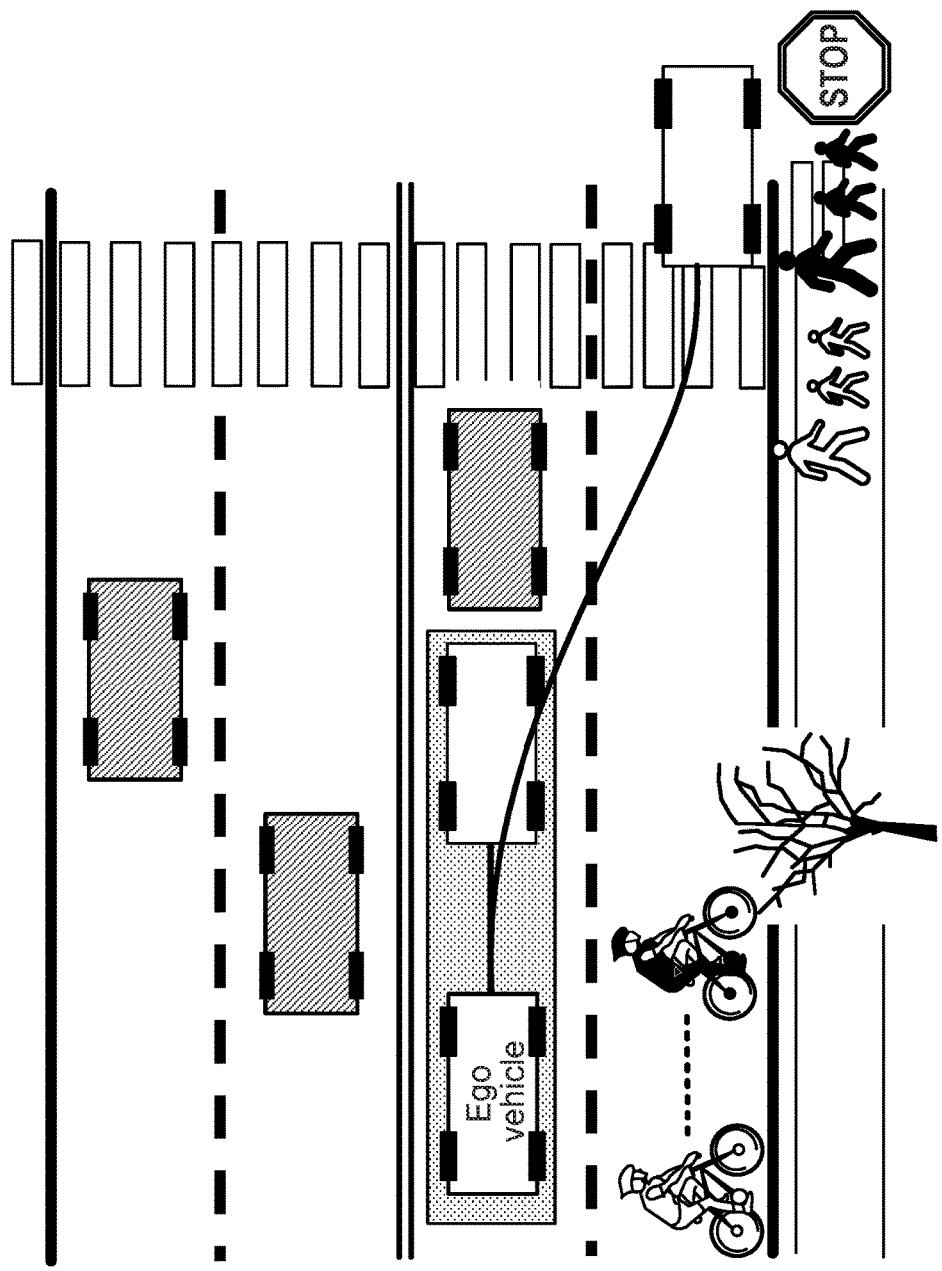
Figure 16:
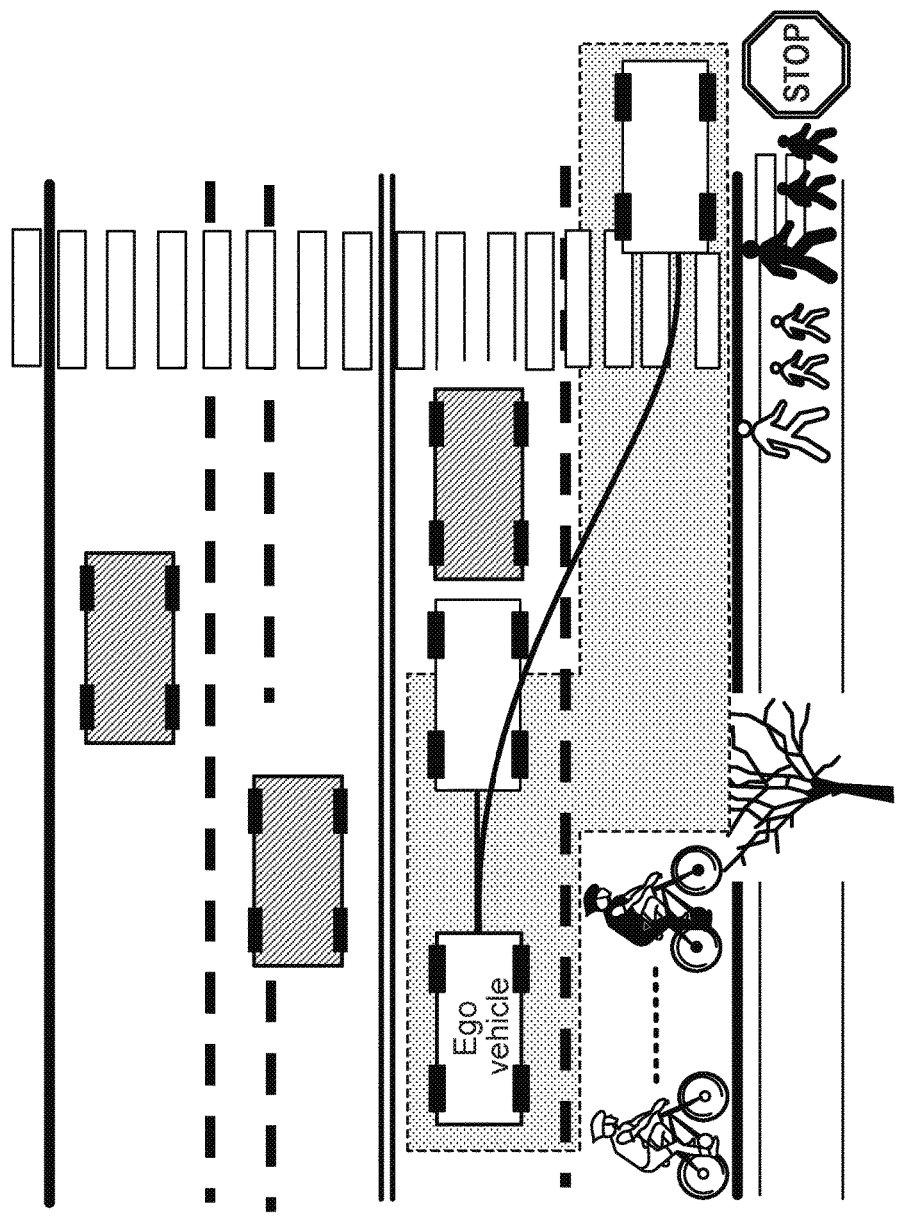
Figure 17:
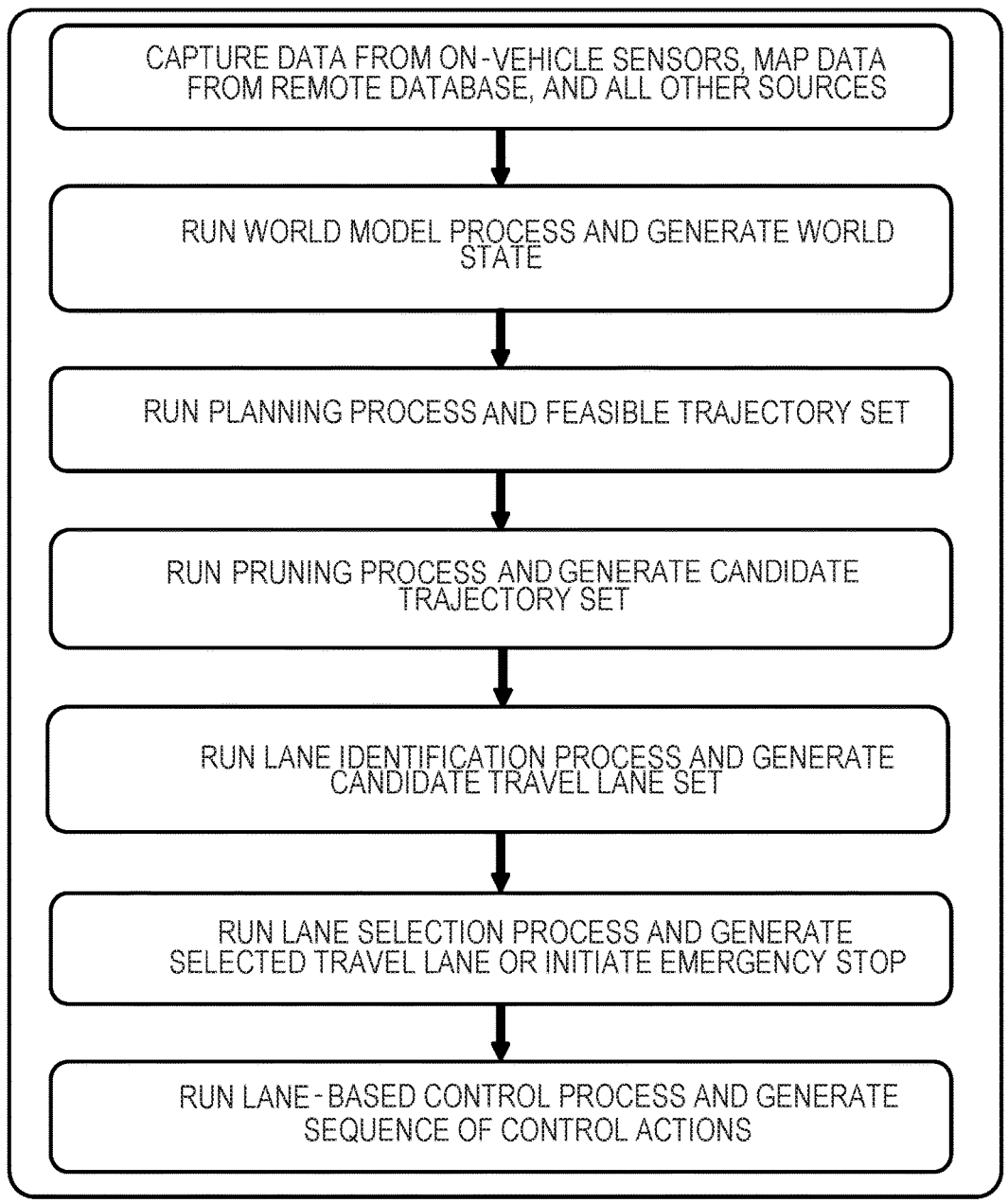
Figure 18:
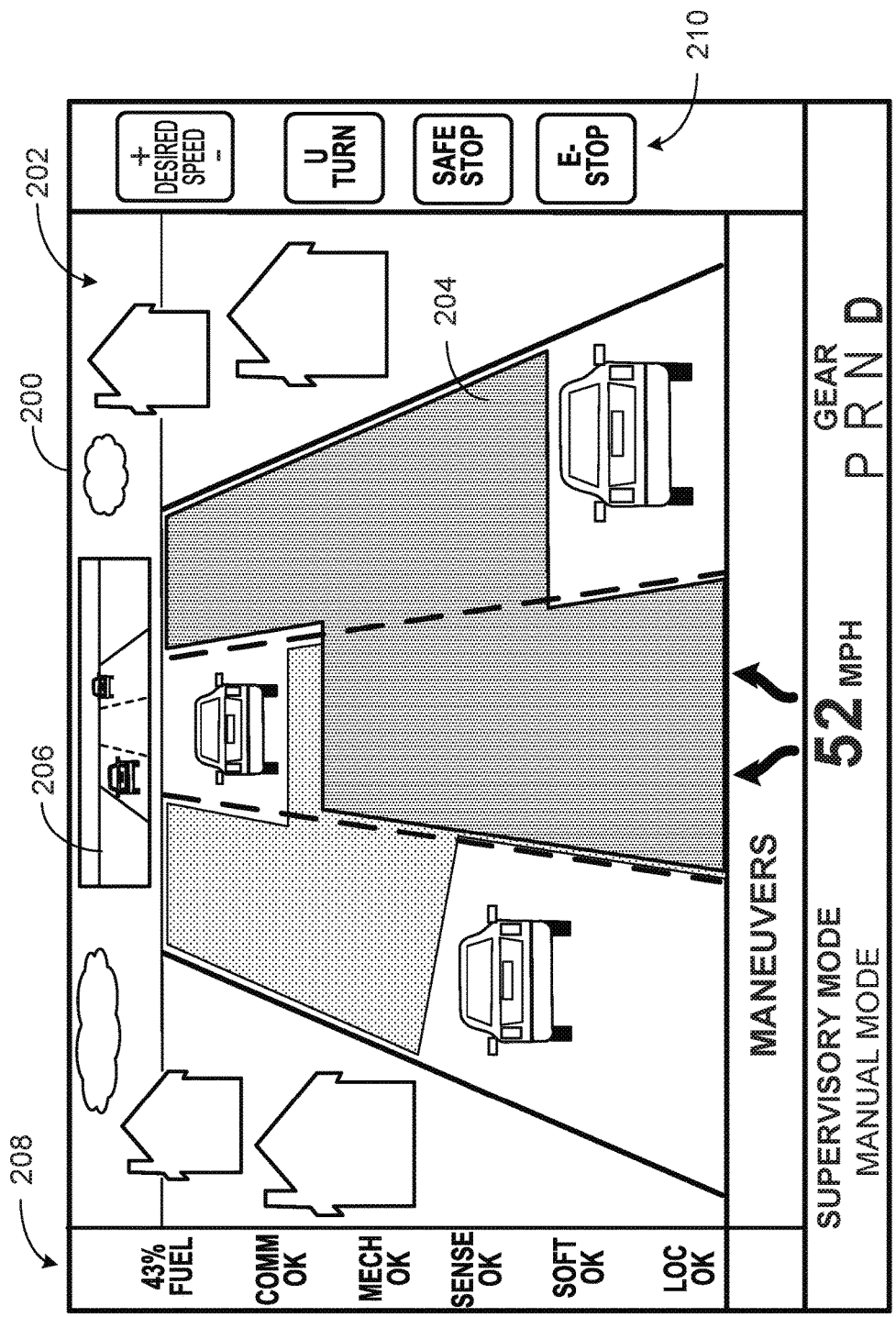
Figure 19:
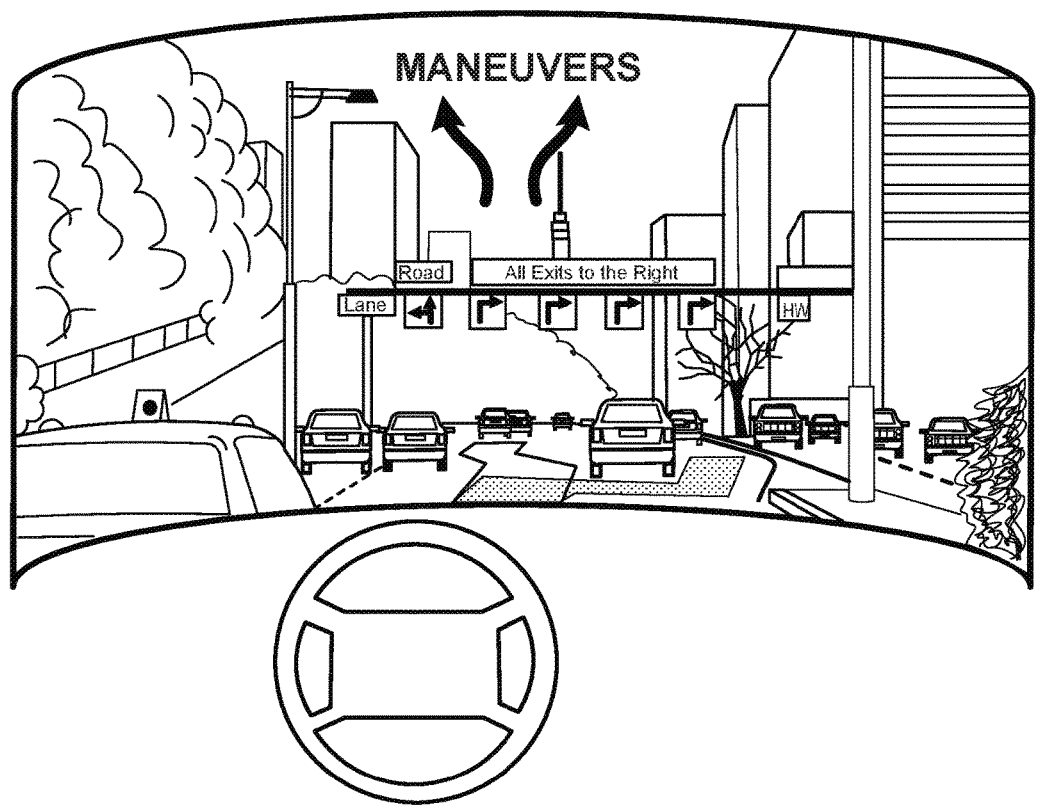
Figure 20:
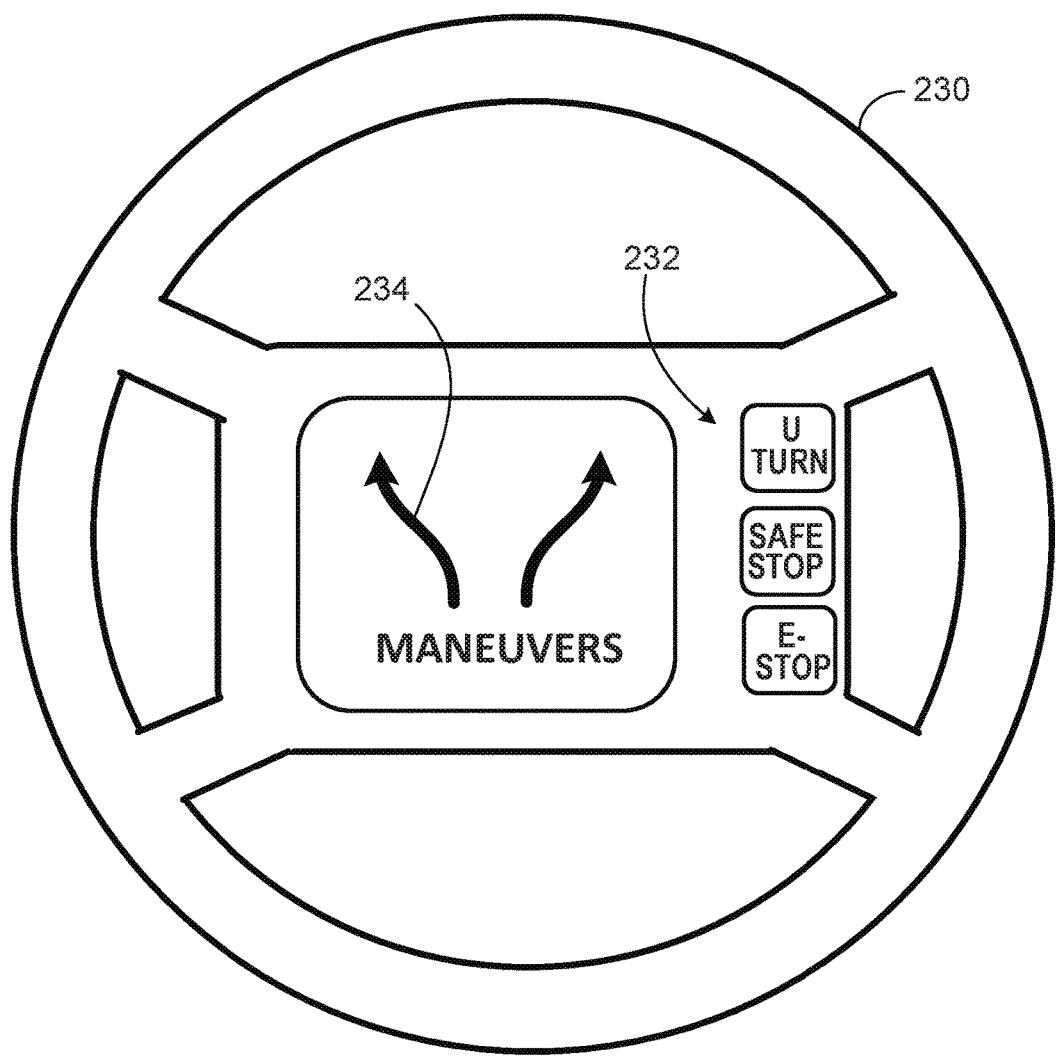

FIG. 1 is a block diagram of a vehicle.
FIG. 2 is a block diagram of a system for generating control actions.
FIG. 3 is a block diagram of a vehicle.
FIG. 4 is a flow diagram of processes to generate control actions.
FIG. 5 is a schematic diagram of a world model process.
FIG. 6 is a block diagram of a planning process.
FIG. 7 is a block diagram of a pruning process.
FIG. 8 is a block diagram.
FIG. 9 is a block diagram of a computer system.
FIG. 10 is a flow diagram of a lane identification process.
FIG. 11 is a flow diagram of a lane selection process.
FIG. 12 is a schematic view of a traffic scenario.
FIG. 13 is a schematic view of feasible trajectories.
FIG. 14 is a schematic view of a candidate trajectory set.
FIGS. 15 and 16 are schematic views of first and second candidate travel lanes.
FIG. 17 is a block diagram at time k.
FIGS. 18, 19, and 20 are displays.

As shown in FIG. 1, here we describe ways to assert supervisory control of the operation of a vehicle 10. The supervisory control may be asserted by a human operator 11 who is located either inside the vehicle or by a teleoperator 13 located outside the vehicle, for example, at a location remote from the vehicle. (In some implementations the supervisory control may be asserted by an in-vehicle computer process 15 or a remote process 171 alone or in combination with a human operator.) The supervisory control can be asserted by supervisory commands 191 provided by the human operator (or the computer process).

A supervisory command expresses an objective (such as a movement or maneuver) to be attained in operation of the vehicle. In general, the objective expressed by a supervisory command is not expressed at the high level of, for example, a sequence of roads to be followed to reach a destination or a turn to be made from one denominated (named or numbered) road to another according to a planned route, nor is it expressed at the low level, for example, of control inputs to the accelerator, brake, steering, or other driving mechanisms of the vehicle. Rather, in some implementations, the supervisory command could express a short-term movement objective, such as a changing the vehicle's lane of travel on a road network or taking an off-ramp of a limited access road, or stopping the vehicle at the next available location on a street, to name a few.

Thus, the supervisory control and supervisory commands can take advantage of physical features of roads and other man-made traveling paths, including features that permit alternative short-run paths along a segment of a route. For example, highways typically have multiple lanes, shoulders, ramps, rest areas, and other features that can be the subject of selections made by a human operator (or a computer process) for a variety of purposes. Supervisory control and supervisory commands can relate to navigating intersections, passing slow-moving vehicles, or making turns from street to street within the street network of an urban environment.

In some implementations of the systems and techniques that we describe here, the supervisory commands are selected or specified (we sometimes use the term "selected" broadly to include making a choice among presented options or specifying or stating the objective or command even though alternative choices have not been presented or a combination of them) by a human operator. The human operator may or may not be a passenger in the vehicle. The human operator may make the selection using one or more of a number of possible input modalities, for example, by clicking on a display screen using a mouse, speaking the objective or selection, touching a touch-sensitive display screen, or entering information (to name a few), to achieve an objective (e.g., a travel lane of the vehicle or a turn direction). Travel lanes are also sometimes known as "lane corridors".

The selected supervisory command is provided to the control system 21 of the vehicle (either directly within the vehicle or wirelessly from the location of a remote human operator to the vehicle). Then, the control system 21 of the self-driving vehicle uses algorithms to determine a sequence of steering wheel, brake, and throttle inputs 23, to cause the vehicle to execute the inputs to achieve the objective expressed by the supervisory command, while avoiding collisions with obstacles (e.g. other vehicles, cyclists, pedestrians, etc.) and adhering to the rules of the road (e.g. obeying traffic signage and signals and adhering to proper precedence in intersections).

In some implementations, the systems and techniques that we describe here therefore provide a way to control a vehicle that is at least, in part, in contrast to direct control of the vehicle's steering, throttle, brakes, or other driving mechanisms 25 by a human operator sitting in a driver's seat of the vehicle. In some implementations of the systems and techniques that we describe here, the supervisory control of the vehicle using supervisory commands need not fully substitute either for fully autonomous control of a vehicle or for fully human control of the vehicle. Rather, any two or all three of the modalities (fully autonomous, fully human, supervisory control) can be used cooperatively, or from time to time, to control the vehicle.

In some implementations, supervisory control is used by a human operator inside the vehicle, and is a convenient way to command a vehicle's travel at a higher conceptual or supervisory level without having to constantly monitor and adjust the steering, throttle, and braking levels. The supervisory control mode therefore results in a more comfortable and less stressful driving experience.

In addition to or in combination with in-vehicle supervisory control, supervisory control of a vehicle is useful for controlling the vehicle remotely (we sometimes refer to this as "teleoperation"). Teleoperation is a useful approach to controlling vehicles that are unoccupied (e.g., a self-driving taxi that has dropped off a passenger and is in route to pick up another passenger) or is occupied by a passenger who has become incapacitated or otherwise requires assistance. In such a scenario, a remotely located teleoperator views a data stream 27 from the vehicle comprised of, for example, a forward-looking video stream collected by one or more cameras on the vehicle. The teleoperator then selects a short-term movement or maneuver or other supervisory objective for the vehicle's control system to execute or achieve, for example, switching to a different travel lane or to a different upcoming roadway. The short-term supervisory control objective is wirelessly transmitted as a supervisory command to a control computer or other control system 21 located on board the vehicle, which subsequently develops and executes the series of inputs 23 to the vehicle necessary to achieve the objective within the given road conditions.

In such a teleoperation scenario, the supervisory character of the supervisory commands, for example, lane-based control, can be especially useful if the communication link between the teleoperator and vehicle is subject to communication delays (i.e., latency). In such instances, it can be difficult for a remote teleoperator to designate a sequence of steering wheel, brake, and throttle inputs to accurately control the vehicle along a desired path or maneuver. In contrast, aspects of the lane-based or other supervisory control described here use supervisory commands that typically are presented at a much lower frequency and produce vehicle motion that is robust to the degrading effects of latency.

As noted above, in some implementations, it is useful to enable a supervisory command representing a short-term objective, such as lane-based control, to be selected either on board the vehicle or using teleoperation. In some cases, an operator inside the vehicle can control the vehicle using supervisory commands when the operator so desires and allow a teleoperator to control the vehicle under certain conditions (e.g., if the operator becomes incapacitated). In some cases, both an in-vehicle and a remote operator can be selecting non-conflicting supervisory commands at essentially the same time; in case of conflicts between supervisory commands provided from the vehicle and from the remote operator, a conflict resolution mechanism can be used to mediate the conflict.

The systems and techniques that we describe here therefore enable controlling operation of a vehicle by an operator either inside the vehicle or outside the vehicle (e.g., at a remote location) by selecting a supervisory command or otherwise identifying a short-term maneuver or other objective, for example, a desired lane of travel for the vehicle on a road network.

We use the term "self-driving (or autonomous) vehicle" broadly to include, for example, any mobile device that carries passengers or objects or both from one or more pick-up locations to one or more drop-off locations, without always (or in some cases ever) requiring direct control or supervision by a human operator, for example, without requiring a human operator to take over control responsibility at any time. Some examples of self-driving vehicles are self-driving road vehicles, self-driving off-road vehicles, self-driving delivery vehicles, self-driving cars, self-driving buses, self-driving vans or trucks, drones, or aircraft, among others. Although control by a human operator is not required, as we discuss here, supervisory control by a human operator (either in the vehicle or remotely) can be applied to a fully self-driving vehicle or to a non-fully-self-driving vehicle (which is also sometimes known as a "partially automated" vehicle).

We use the term "regulatory data" (or sometimes, the term "rules of operation" or "rules of the road") broadly to include, for example, regulations, laws, and formal or informal rules governing the behavior patterns of users of devices, such as road users including vehicle drivers. These include rules of the road as well as best practices and passenger or operator preferences, described with similar precision and depth. We use the term "historical information" broadly to include, for example statistical data on behavior patterns of road users, including pedestrians, and cyclists, in each case possibly as a function of location, time of day, day of the week, seasonal and weather data, or other relevant features, or combinations of them.

We use the term "supervisory control" broadly to include, for example, any kind of control that occurs with a frequency less often than is required for the direct control inputs 31 to the accelerator, brake, steering, or other driving mechanisms 25 of a vehicle or applies to a time frame that is longer than the time frame associated with each of such direct control inputs or applies to a travel distance that is longer than the minimal distance to which a typical control input to the driving mechanisms of the car applies. For example, the frequency of supervisory control may be less than once every few seconds or once every minute or once every few minutes or even less frequently. The time frame to which the supervisory control applies may be, in some cases, longer than a few seconds or longer than a few minutes. The travel distance to which a supervisory control applies may, for instance, be greater than a few hundred feet or greater than a mile or greater than a few miles.

We use the term "objective" broadly to include, for example, a travel goal or maneuver relative to the physical features of roads and other man-made traveling paths, including features that permit alternative short-run paths or maneuvers along a segment of a route.

We use the term "supervisory command" broadly to include, for example, any statement, selection, choice, identification, or other expression of a supervisory control objective made in any manner or by any action or gesture or utterance through any kind of an interface, including a human user interface.

Additional information about control of autonomous vehicles is set forth in U.S. patent application Ser. No. 15/078,143, filed Mar. 23, 2016, the entire contents of which are incorporated here by reference.

As shown in FIG. 2, in some implementations that involve facilitating the operation of a self-driving road (or other) vehicle 10, for example, the vehicle can be driven without direct human control or supervisory control through an environment 12, while avoiding collisions with obstacles 14 (such as other vehicles, pedestrians, cyclists, and environmental elements) and obeying the rules of operation (rules of the road 16, for example). In the case of an autonomous vehicle, to accomplish automated driving, the vehicle (e.g., the computer system or data processing equipment 18 (see also FIG. 9) associated with, for example attached to, the vehicle) first generally constructs a world model 20.

Roughly speaking, a world model is a representation of the environment of the vehicle, e.g., constructed using data from a geolocation device, a map, or geographic information system or combinations of them, and sensors that detect other vehicles, cyclists, pedestrians, or other obstacles. To construct the world model, the computer system, e.g., aboard the vehicle, collects data from a variety of sensors 22 (e.g., LIDAR, monocular or stereoscopic cameras, RADAR) that are mounted to the vehicle (which we sometimes refer to as the "ego vehicle"), then analyzes this data to determine the positions and motion properties (which we sometimes refer to as obstacle information 24) of relevant objects (obstacles) in the environment. The term "relevant objects" broadly includes, for example, other vehicles, cyclists, pedestrians, and animals, as well as poles, curbs, traffic cones, traffic signs, traffic signals, and barriers. There may also be objects in the environment that are not relevant, such as small roadside debris and vegetation. In some instances, self-driving vehicles also rely on obstacle information gathered by vehicle-to-vehicle or vehicle-to-infrastructure communication 26.

Given the world model, the computer system aboard the self-driving vehicle employs an algorithmic process 28 to automatically generate a candidate trajectory set 30 and execute a selected trajectory 31 of the set (determined by a trajectory selection process 37) through the environment toward a designated goal 32 and, in response to supervisory commands 191 that it may receive along the way, select alternate trajectories. The term trajectory set broadly includes, for example, a set of paths or routes from one place to another, e.g., from a pickup location to a drop off location. In some implementations, a trajectory can comprise a sequence of transitions each from one world state to a subsequent world state.

The designated goal is generally provided by an algorithmic process 34 that relies, for example, on passenger-provided information 35 about a passenger's destination or a goal destination provided by an algorithmic process or a combination of the two. The word "goal" is used broadly to include, for example, the objective to be reached by the self-driving or other vehicle, such as, an interim drop off location, a final drop off location, a destination, among others, or maintaining a present course. The term "passenger" is used broadly to include, for example, one or more human beings who are carried by the self-driving or other vehicle, or a party who determines a destination for an object to be carried by a self-driving vehicle, among other things. In some instances, the party is remote to the vehicle and provides goal information to the vehicle prior to or during operation.

In some instances, the goal to be reached (or other objective to be attained) by the self-driving or other vehicle is not a physical location, but a command to maintain a course or speed of the vehicle, without a pre-determined destination, or to proceed on a certain course (e.g., traveling in a compass direction).

The automatically generated candidate trajectory set 30 can contain one or more trajectories each possessing at least the following properties:

1) It should be feasible, e.g., can be followed by the vehicle with a reasonable degree of precision at the vehicle's current or expected operating speed;

2) It should be collision free, e.g., were the vehicle to travel along the trajectory, it would not collide with any objects; and 3) It should obey a predefined set of rules, which may include local rules of operation or rules of the road, common driving practices 17, or the driving preferences 19 of a general class of passenger or a particular passenger or a combination of any two or more of those factors. Together these and possibly other similar factors are sometimes referred to generally as rules of operation (and we sometimes refer to rules of operation as driving rules). When no trajectory exists that obeys all predefined driving rules, the trajectory can minimize the severity and extent of rule violation.

Automated candidate trajectory generation should satisfy the three properties described above, in a context in which the environment (e.g., the road) is shared with other independent agents 21, including vehicles, pedestrians, and cyclists, who move independently under their own wills.

Automated candidate trajectory generation also should systematically ensure that the driving rules will be correctly obeyed by the ego vehicle in complex scenarios involving several relevant driving rules or the presence of numerous obstacles, or scenarios in which there does not exist a trajectory that would comply with all of the driving rules, or combinations of two or more of such conditions.

Given, the automatically generated candidate trajectory set, a trajectory selection process 37 chooses a trajectory 31 for the vehicle to follow. In addition to receiving the candidate trajectory set 30 and selecting the trajectory 31, the trajectory selection process is responsive to supervisory commands 191 provided by, for example, a driver or other passenger at the vehicle or a remote teleoperator. The supervisory commands may involve, for example, selecting a travel lane, turning onto a different roadway, changing velocity, stopping travel, or other typical movement or other objectives. In response to a supervisory command, the trajectory selection process determines if a candidate trajectory exists that satisfies the supervisory command and selects a qualifying candidate trajectory as the selected trajectory.

In some implementations of the systems and techniques that we describe here, control actions for the vehicle can be based on real-time sensor data and historical information that enable the vehicle to respond safely and reliably to supervisory commands provided by a passenger or a teleoperator, while driving on, for example, a road network shared with other vehicles and pedestrians and complying with the applicable driving rules.

As shown in FIG. 3, an example system 50 can include some or all of the following basic elements:

(A) Sensors 52 able to measure or infer or both properties of the ego vehicle's state 54 and condition 56, such as the vehicle's position, linear and angular velocity and acceleration, and heading. Such sensors include but are not limited to, e.g., GPS, inertial measurement units that measure both vehicle linear accelerations and angular rates, individual wheel speed sensors and derived estimates of individual wheel slip ratios, individual wheel brake pressure or braking torque sensors, engine torque or individual wheel torque sensors, and steering wheel angle and angular rate sensors, and combinations of them. The properties of the vehicle being sensed could also include the condition of software processes on the car, tire pressure, and mechanical faults, among others.

(B) Sensors 58 able to measure properties of the vehicle's environment 12. Such sensors include but are not limited to, e.g., LIDAR, RADAR, monocular or stereo video cameras in the visible light, infrared, or thermal spectra, ultrasonic sensors, time-of-flight (TOF) depth sensors, as well as temperature and rain sensors, and combinations of them. Data from such sensors can be processed to yield information about the type, position, velocity, and estimated future motion of other vehicles, pedestrians, cyclists, scooters, carriages, carts, animals, and other moving objects. Data from such sensors can also be used to identify and interpret relevant objects and features such as static obstacles (e.g., poles, signs, curbs, traffic signals, traffic marking cones and barrels, road dividers, trees), road markings, and road signs. Sensors of this type are commonly available on vehicles that have a driver assistance capability or a highly automated driving capability (e.g., a self-driving vehicle).

(C) Devices 60 able to communicate the measured or inferred or both properties of other vehicles' states and conditions, such as other vehicles' positions, linear and angular velocities and accelerations, and headings. These devices include Vehicle-to-Vehicle (V2) and Vehicle-to-Infrastructure (V2I) communication devices and devices for wireless communications over point-to-point or ad-hoc networks or both. The devices can operate across the electromagnetic spectrum (including radio and optical communications) or other media (e.g., acoustic communications).

(D) Data sources providing historical, real-time, or predictive (or any two or more of them) data about the environment, including traffic congestion updates and weather conditions. In some instances, such data is stored on a memory storage unit 65 on the vehicle or transmitted to the vehicle by wireless communication from a remotely located database.

(E) Data sources 64 providing road maps drawn from GIS databases, potentially including high-precision maps of the roadway geometric properties, maps describing road network connectivity properties, maps describing roadway physical properties (such as the number of vehicular and cyclist travel lanes, lane width, lane traffic direction, lane marker type, and location), and maps describing the spatial locations of road features such as crosswalks, traffic signs of various types (e.g., stop, yield), and traffic signals of various types (e.g., red-yellow-green indicators, flashing yellow or red indicators, right or left turn arrows). In some instances, such data is stored on a memory unit 65 on the vehicle or transmitted to the vehicle by wireless communication from a remotely located database 67.

(F) Data sources 66 providing historical information about driving properties (e.g. typical speed and acceleration profiles) of vehicles that have previously traveled along a given road section at a similar time of day. In some instances, such data is stored on a memory storage unit on the vehicle or transmitted to the vehicle through wireless communication from a remotely located database.

(G) A computer system 18 (data processor) located on the vehicle that is capable of executing algorithms 69, e.g., as described in this application. The algorithms, among other things, process data provided by the above sources and (in addition to other results discussed below), compute potential trajectories that the ego vehicle may follow through the local environment over a short future time horizon (the time horizon can be, for example, on the order of 2-5 seconds, although, in some cases, the time horizon can be shorter (for example, fractions of seconds) or longer (for example tens of seconds, minutes, or many minutes). The algorithms can also jointly analyze the potential trajectories, the properties of the environment (e.g. the locations of neighboring vehicles and other obstacles), and the properties of the local road network (i.e. the positions and physical properties of travel lanes) to identify alternative travel lanes or other travel paths that contain safe trajectories for the ego vehicle to travel along.

(H) A display device or devices 70 aboard the vehicle (or may also be located remotely for use by a teleoperator) that is connected to the computer system, to provide a wide variety of information to a vehicle operator or teleoperator. As shown in FIG. 18, in some examples, this information includes a video display 200 of the environment ahead of the ego vehicle 202, and visual identification, in the form of a translucent overlay, colored outline, or other format 204, of travel lanes that have been identified to contain safe trajectories for the ego vehicle using, for example, the systems and techniques that we describe in this document. In some instances, the display device also transmits video information from the rear of the vehicle 206, if the vehicle is in reverse gear to aid a backing up maneuver, or if the vehicle is in a forward gear to serve a function similar to a rear view mirror to inform the vehicle operator (or a teleoperator) of traffic behind the vehicle.

In some instances, other information is also provided to the operator regarding, for example, the operation, state, or condition of the vehicle 208, the alertness or health of a human driver or passenger, the trajectory of the vehicle, maps, information derived from one or more of the sensors, information about obstacles, alerts of various types, input controls 210 representing possible maneuvers that an operator could select, and other information, and combinations of any two or more of them. In the teleoperation scenario, a display device is located in a remote location such as an office, where it can be viewed by a teleoperator. In some instances, the display device is a standard video monitor 200, a head-mounted virtual reality display device, an in-vehicle head-up display 220 (FIG. 19), a display device mounted in the vehicle center console or embedded in the back of the front seats (to be visible to occupants in the rear of the vehicle) or mounted elsewhere in the vehicle, or may take on other forms. For example, as shown in FIG. 20, a steering wheel 230 can include buttons 232 by which the operator can send supervisory commands for given maneuvers, and a central electronic display of simple intuitive icons 234 that represent alternatives (in this case lane changes to the left or right) from which a user can select.

(I) An input device 53 (as illustrated in FIGS. 18, 19, and 20) connected to, or embedded within, the display device 70, and connected to the computer system 18 (and therefore located either aboard the vehicle or at a remote location, or both), which in its typical state allows an operator located either inside the vehicle or at a remote location to select a supervisory objective or a supervisory command that expresses a supervisory objective, for example, one of potentially multiple travel lanes containing safe trajectories, and, in some instances, also specify a desired speed of the vehicle. More broadly, any one or more (or a combination) of a broad variety of maneuvers can be specified by the operator through the input device including lane changes, u-turns (say, by using a "u-turn" button), pulling off onto a shoulder, parking, multipoint turns, or taking a ramp, to name a few. By using the input device to select, for example, a specific desired travel lane, the operator designates the general desired path of the vehicle without having to provide specific steering, brake, and throttle commands at high frequency.

The input device 53 can assume many forms, including a touchscreen (that would enable an operator to touch a part of the screen to indicate a travel lane), a mouse or trackball, or a keyboard, or a visual system or an audio system that can interpret the operator's gestures or utterances or combinations of two or more of them. The input device can also take the form of a standard steering wheel and pedal set (e.g. brake and throttle), in which case the operator can designate a desired travel lane by steering the wheel to indicate a desired maneuver (i.e. turning the wheel to the right would indicate a desire to choose a travel lane to the right of the vehicle), and actuate the pedals to adjust a desired vehicle speed setpoint. In the teleoperation scenario, an input device is located in a remote location such as an office or in another vehicle such as a van or trailer, where it can be viewed by a teleoperator. The teleoperation scenario does not preclude the use of a steering wheel and pedals as an input device at the remote location.

In some implementations, an operational state of the input device allows an operator located inside the vehicle or at a remote location to directly command the position of the vehicle steering wheel, brake, and throttle, select the gear, and activate turn signals, hazard lights, and other indicators, in other words, to drive the vehicle in the conventional way. Although this form of direct vehicle control may have disadvantages in certain cases (e.g., when the communication link between the teleoperator and vehicle is subject to long communication delays), in certain instances it is useful as a back-up control mode, for example, in scenarios in which it is not possible to safely execute lane-based or other supervisory control, e.g., in cases where a collision has resulted in damage to certain vehicle sensors that are required for lane-based or other supervisory control.

(J) A wireless communication device 72 configured, among other things, to transmit data from a remotely located database to the vehicle and to transmit data to a remotely located database. In some instances, the transmitted data includes video information captured from a camera showing the scene ahead of or behind the vehicle or both. In some instances, the transmitted data carries a wide variety of additional information including, for example, the operation, state, or condition of the vehicle, the trajectory of the vehicle, the optimal trajectory, information related to maps, information derived from one or more of the sensors, information about obstacles, alerts of various types, and other information, and combinations of any two or more of them.

(K) A vehicle 10 having features and functions (e.g., actuators) that are instrumented to receive and act upon direct commands 76 corresponding to control actions (e.g., steering, acceleration, deceleration, gear selection) and for auxiliary functions (e.g., turn indicator activation) from the computer system. The term "direct command" is used broadly to include, for example, any instruction, direction, mandate, request, or call, or combination of them, that is delivered to the operational features and functions of the vehicle. The term "control action" is used broadly to include, for example, any action, activation, or actuation that is necessary, useful, or associated with causing the vehicle to proceed along at least a part of a trajectory or to perform some other operation. We sometimes use the term "control inputs" broadly to refer to signals, instructions, or data that are sent to cause control actions to occur.

(L) A memory 65 to which the computer system 18 has access on the vehicle to store, for example, any of the data and information mentioned above.

Described below, and as shown in FIG. 3 (and referring also to FIG. 9) is an example technique 80 for supervisory control (e.g., lane-based control) of a vehicle by a remote teleoperator or by an operator located inside the vehicle, resulting in a set or sequence of control actions 82 used by actuators or other driving mechanisms 87 (e.g., the features and functions of the vehicle that can respond to control actions) and based on real-time sensor data, other data sources, and historical information. In some implementations, the techniques comprise at least the following processes that are run on the computer system 18 in the vehicle 10 (the steps in an exemplary process are shown in FIG. 4:

(A) A world model process 84, as shown also in FIG. 5, which analyzes data 86 collected, for example, by on-board vehicle sensors 87 and data sources 89, and data received through vehicle-to-vehicle or vehicle-to-infrastructure communication devices, to generate an estimate (and relevant statistics associated with the estimate) of quantities 83 that characterize the ego vehicle and its environment. Roughly speaking the world model estimates the state of the ego vehicle and the environment based on the incoming data. The estimate produced by the world model as of a given time is called a world state 88 as of that time.

Quantities expressed as part of the world state include, but are not limited to, statistics on: the current position, velocity, and acceleration of the ego vehicle; estimates of the types, positions, velocities, and current intents of other nearby vehicles, pedestrians, cyclists, scooters, carriages, carts, and other moving objects or obstacles; the positions and types of nearby static obstacles (e.g., poles, signs, curbs, traffic marking cones and barrels, road dividers, trees); and the positions, types and information content of road markings, road signs, and traffic signals. In some instances, the world state also includes information about the roadway's physical properties, such as the number of vehicular and cyclist travel lanes, lane width, lane traffic direction, lane marker type and location, and the spatial locations of road features such as crosswalks, traffic signs, and traffic signals. The world state 88 contains probabilistic estimates of the states of the ego vehicle and of nearby vehicles, including maximum likelihood estimate, error covariance, and sufficient statistics for the variables of interest.

As shown also in FIG. 5, when the world model process 84 is executed with respect to a given time, data is captured from all available vehicle sensors and data sources and processed to compute some or all of the following quantities 83 as of that time:

1. The position and heading of the ego vehicle in a global coordinate frame. In some instances, these quantities are directly measured using a GPS system or computed by known techniques (e.g., so-called "localization" methods that combine information from GPS, IMU (inertial measurement unit), wheel speed sensors, and potentially other sensors such as LIDAR sensors.
2. The linear and angular velocity and acceleration of the ego vehicle. In some instances, these quantities are directly measured using an IMU system.
3. The steering angle of the ego vehicle. In some instances, this quantity is directly measured by standard automotive sensors.
4. The positions of stop signs, yield signs, speed limit signs, and other traffic signs relevant to the ego vehicle's current direction of travel. In some instances, these quantities are measured using commercially available devices or by known techniques). In some instances, the quantities are also gathered from commercially available map data that includes such information (e.g., from specialty map providers such as TomTom®), or from commercially available maps that have been manually annotated to include such information. In some instances, if such information is gathered from map data, it is stored on the memory storage unit 65 on the vehicle or transmitted to the vehicle by wireless communication from a remotely located database, as mentioned earlier.
5. The boundaries of the drivable road surface, markings demarcating individual travel lanes (including both the positions and types of such markings), and the identified edges of an unpaved track. In some instances, these quantities are measured using commercially available sensors or by known techniques. In some instances, these quantities are also gathered from commercially available map data as described in item 4.
6. The state (e.g., red/yellow/green/arrow) of traffic signals relevant to the ego vehicle's current direction of travel. In some instances, these quantities are measured by commercially available devices or known techniques.
7. The positions of pedestrian crosswalks, stop lines, and other road features. In some instances, these quantities are gathered from commercially available map data as described in item 4. In some cases these quantities are derived from on-vehicle sensors.
8. The positions and velocities of other vehicles, pedestrians, cyclists, scooters, carriages, carts, and other moving objects relevant to the ego vehicle's current lane of travel. In some instances, these quantities are measured using commercially available devices.
9. The positions of static obstacles (e.g., poles, signs, curbs, traffic marking cones and barrels, road dividers, trees) on the drivable road surface. In some instances, these quantities are measured using commercially available devices.
10. The current atmospheric conditions, for example, whether it is snowing or raining, and whether it is cold enough for ice to be present on the road surface. In some instances, these quantities are directly measured or inferred using standard automotive rain and temperature sensors.
11. Historical information about driving properties (e.g. typical speed and acceleration profiles) of vehicles that have previously traveled along the road section at a similar time of day. In some instances, such data is stored on the memory storage unit on the vehicle or transmitted to the vehicle using wireless communication from the remotely located database.

In some instances, the computer system 18 usefully functions in the absence of a complete set of the quantities listed above. In some instances, one or more of the computed quantities described in 1 through 11 above are stored in the memory unit on the vehicle.

(B) A planning process 90, as also shown in FIG. 6, which takes as an input a world state 88 (e.g., a data structure of the form of the output of the world model) and employs known numerical or analytical methods in order to estimate or predict a set of trajectories (i.e., a sequence of states indexed by time), known as the feasible trajectory set 98 as of that time, that the physical ego vehicle could feasibly follow from the given time to some future time. FIG. 12 shows a schematic view of a world state of an ego vehicle at a given time. FIG. 13 illustrates a corresponding feasible trajectory set. The term "feasibly" is used broadly to include, for example, a circumstance in which a trajectory can be followed by the vehicle with a reasonable degree of precision at the vehicle's current or expected operating speed, given the current road geometry, road surface conditions, and environmental conditions. Typical algorithmic methods employed in the planning process include methods based on state lattices, rapidly exploring random trees, numerical optimization, and others. The feasible trajectory set typically contains multiple trajectories but, in some instances, contains one or zero trajectories.

(C) A pruning process 110, as also shown in FIG. 7, which takes as an input a world state 88 and the feasible trajectory set 98, and eliminates from further analysis any trajectory that is determined to be in collision with any static or dynamic object or obstacle identified in the world model process or predicted to be in collision at some future time, by employing known collision checking methods. FIG. 14 illustrates a candidate trajectory set resulting from a pruning process based on the trajectory set of FIG. 13.

The pruning process also eliminates from further analysis any trajectory that crosses the boundaries of the drivable road surface, either by departing the roadway or crossing into an oncoming lane of traffic in a manner that could lead to collision with an oncoming vehicle, by employing analysis of the geometric properties of both the trajectory and the boundaries of the drivable road surface. If analysis suggests that it is safe to cross into an oncoming lane of traffic, for the purpose of passing a slow-moving or parked car, or executing a multi-point turn or U turn, then such trajectories may be ignored by the pruning process. If analysis suggests that it is safe to cross the boundary of the road surface onto a road shoulder, then such trajectories may be ignored by the pruning process.

In some instances, the pruning process also eliminates from further consideration any trajectory that violates local rules of operation or rules of the road, common driving practices, or the driving preferences of a general class of passenger or a particular passenger or a combination of any two or more of those factors.

In some instances, the pruning process also eliminates from further consideration any trajectory that fails to satisfy a condition related to the "cost" of the trajectory, where the cost can be determined through analysis of any number of properties relevant to the driving task, including the geometric properties of the trajectory (which influences the comfort that would be experienced by passengers when traveling along the trajectory), the type, frequency of incidence, and severity of violation of local rules of operation or rules of the road, common driving practices, or the driving preferences of a general class of passenger or a particular passenger associated with the trajectory.

The output of the pruning process is known as the candidate trajectory set 119 as of that time.

(D) A lane identification process 110, as shown in FIG. 10, which takes as an input a world state 88 and a candidate trajectory set 119, and identifies none, one, or more than one candidate travel lanes in which the ego vehicle may safely travel from the given time to some future time. A candidate travel lane is conceived as a tube-like structure that contains one or more candidate trajectories, and may be confined to a single travel lane (i.e., the current travel lane of the ego vehicle), or may exhibit one or more lane changes. Candidate travel lanes are generated by identifying connected lane segments that contain a candidate trajectory, by analysis of the spatial properties of both the candidate trajectory and road network. FIGS. 15 and 16 illustrate respectively two candidate travel lanes generated by a lane identification process based on the candidate trajectory set of FIG. 14. A candidate travel lane does not necessarily align with marked lanes on a street, road, or highway, and a candidate travel lane may overlap or lie within a shoulder.

An example procedure for analyzing the spatial properties of both the candidate trajectory and road network is as follows:

1) Discretize into closely-spaced points the road "backbone" path that is typically included in a road network database and describes the structure, geographic properties, and connectivity properties of the road(s) of interest; in some cases discretization may not be necessary for such an analysis; it may be sufficient to have a representation of the backbone discretized points or parametrized curve); and there could be multiple potential lanes for some points if lanes are merging or diverging;
2) Analyze each closely-spaced point in a region surrounding the ego vehicle to determine if the point lies within a specified small distance from a specific candidate trajectory of interest. If a point lies within a specified distance, declare that point and a region (similar in size to the width of a typical travel lane) around that point to be part of a candidate travel lane. The output of steps 1-2 is a tube-like structure, within which lies the candidate trajectory of interest.
3) Repeat the process of 1-2 for all candidate trajectories in the candidate trajectory set to identify a candidate travel lane associated with each candidate trajectory.
4) Analyze the similarity of all candidate travel lanes generated by 1-3 by computing a metric related to the degree of geometry similarity between each of the candidate travel lanes. The candidate travel lanes with a degree of geometric similarity that exceeds a pre-defined threshold can be combined into a single candidate travel lane.

The output of the lane identification process is known as the candidate travel lane set 121 as of that time.

Although in this example we refer to lane identification and a candidate travel lane set, a wide variety of objectives and travel paths and maneuvers (such as U turns, multi-point turns, and parking maneuvers) other than lane changes could similarly be the subject of identification process 110 and could result in a candidate travel path set by identifying connected travel path segments that contain a candidate trajectory. Similar alternatives to the lane-related concepts discussed below would also be possible.

In some instances, the candidate travel lane set (or other candidate travel path set) is presented to an operator located, for example, either inside the vehicle or at a remote location, or both, through a variety of display media and methods, including presentation of iconic representations associated with candidate travel lanes (FIG. 20), presentation of translucent overlays associated with each candidate travel lane on a heads up display (FIG. 19) to an operator located inside the vehicle, or presentation of translucent overlays associated with each candidate travel lane atop a video stream captured by an on-vehicle camera and displayed to a remote vehicle operator on a video screen (FIG. 18) or a virtual reality head-mounted display, among other approaches. In some implementations, an estimate of the free space could be displayed to the operator based on sensor and map data; the operator then could specify a geometric path that the planned path should be close to, or avoidance constrains, for use by the planner.

(E) A lane (or other type of travel path) selection process 120, as shown in FIG. 11, which takes as an input a candidate travel lane (or other travel path) set 121 and, in some instances, takes as an input a supervisory command 191 provided through an input device(s) by an operator located, for example, either inside the vehicle or at a remote location. The input from the operator identifies or otherwise selects one of potentially multiple travel lanes (or other types of travel paths) within the candidate set as the desired lane or path of travel for the ego vehicle. In some instances, the input device is a traditional vehicle steering wheel and pedal set, or a touch screen, mouse, speech command recognition system, or other general input device, or combinations of them. In some instances, in addition to providing a means for lane selection or other maneuvers, the input device also allows an operator to activate vehicle lights (e.g., signal, hazard, and headlights), the vehicle horn, locks, and other standard functions.

If no travel lane (or other travel path) is selected by the operator, the travel lane (or other travel path) most closely associated with the current travel lane or path, by analysis of the spatial properties of the current travel lane or path and the candidate travel lane or path set, is chosen as the desired lane of travel. This can be accomplished, for example, by analyzing all candidate travel lanes in the candidate travel lane set, and computing a metric related to the degree of geometry similarity between the current travel lane and all candidate travel lanes. The candidate travel lane with the highest degree of geometry similarity to the current travel lane is selected as the desired lane of travel.

The output of the lane selection process is known as the selected travel lane 131 (or in other examples, the selected travel path).

If the candidate travel lane set is empty, therefore preventing selection of a desired travel lane and implying that there exists no candidate trajectories, an emergency stop procedure may be initiated, in which the vehicle automatically applies maximum braking effort or decelerates at a more comfortable rate, so long as the vehicle will not hit an object along its current path.

(F) A lane-based or other supervisory control process 140 (see FIG. 4), which takes as an input the desired lane or path of travel and generates a sequence of control actions 82 used by actuators (e.g., the features and functions of the vehicle that can respond to control actions) to guide the vehicle through the desired lane of travel or other movement or objective. Possible ways to guide a vehicle along a desired travel lane with defined lane boundaries are numerous, and include exemplary methods such as the following:

1) Employing Model Predictive Control (MPC) to identify a sequence of control actions subject to the constraint that the resulting vehicle trajectory must lie within the desired travel lane boundaries, with the goal (expressed through formulation of a cost function in the MPC problem) of maintaining a travel speed near to the desired travel speed, and a position near to the computed centerline of the desired travel lane.

2) Employing a pure pursuit control method to track the centerline of the desired travel lane at the desired velocity. More generally, employing control methods that lie within the general family of PD (proportional-derivative) control methods.

As part of the lane-based or other supervisory control process, if the selected travel lane requires the ego vehicle to change lanes, lane change signals may be automatically activated at the appropriate time. Also as part of the lane-based or other supervisory control process, if the selected travel lane requires the ego vehicle to perform an emergency stop or to come to a stop at the road shoulder, hazard lights may be automatically activated at the appropriate time.

Other implementations are also within the scope of the following claims.

For example, although much of the discussion has involved lane change supervisory commands, a wide variety of other maneuvers, movements, and other actions may be the subject of the supervisory commands, as suggested above.

We have also focused the discussion on a human operator being the source of the supervisory commands. In some implementations, however, the supervisory commands made be selected or expressed by a machine or by a machine in combination with a human operator.

The invention claimed is:

1. A method comprising:
receiving, by an autonomous vehicle, a command from a source that is remote from the autonomous vehicle, the command expressing an objective for operation of the autonomous vehicle within a travel segment of a travel route, the travel segment comprising a highway, road, or street, the objective spanning a time series of control inputs that are to be delivered by the remote source to the autonomous vehicle;
determining an operation of the autonomous vehicle to effect the command, the operation comprising a candidate travel speed and a candidate travel lane of the travel segment associated with the time series of control inputs;
generating the time series of control inputs for one or more actuators of the autonomous vehicle in accordance with the determined operation; and
causing the autonomous vehicle to perform the determined operation in accordance with the time series of control inputs.

2. The method of claim 1 in which the source comprises a teleoperation facility.

3. The method of claim 1 in which the source is located in another vehicle.

4. The method of claim 1 in which the command is received from a human being or a process or a combination of a human being and a process at the remote source.

5. The method of claim 1 in which a display of the autonomous vehicle and its environment is provided at the remote source to a human operator.

6. A method comprising:
receiving, by an autonomous vehicle, a command from a human operator at the autonomous vehicle in response to a display of available options for alternative objectives, the command expressing an objective for operation of the autonomous vehicle within a travel segment of a travel route, the objective spanning a time series of control inputs that are to be delivered to the autonomous vehicle;
determining an operation of the autonomous vehicle to effect the command, the operation comprising a candidate travel speed and a candidate travel lane of the travel segment associated with the time series of control inputs;
generating the time series of control inputs for one or more actuators of the autonomous vehicle in accordance with the determined operation; and
causing the autonomous vehicle to perform in accordance with the time series of control inputs.

7. The method of claim 6 in which the display comprises a video display within the autonomous vehicle.

8. The method of claim 7 in which the available options are displayed as icons.

9. The method of claim 6 in which the available options are displayed on a display that is part of a steering wheel, a center console, or a back of a front seat.

10. The method of claim 6 in which the available options are displayed on a head up display.

11. The method of claim 6 in which the available options are displayed together with a representation of at least one man-made travel structure towards which the autonomous vehicle is traveling.

12. The method of claim 6 in which the objective comprises a travel lane.

13. The method of claim 6 in which the objective comprises other than a travel lane.

14. A method comprising:
receiving, by an autonomous vehicle, a command expressing an objective for operation of autonomous vehicle within a travel segment of a travel route, the objective spanning a time series of control inputs that are to be delivered to the autonomous vehicle;
determining an operation of the autonomous vehicle to effect the command, the operation comprising a candidate travel speed and a candidate travel lane of the travel segment associated with the time series of control inputs;
generating the time series of control inputs for one or more actuators of the autonomous vehicle in accordance with the determined operation; and
causing the autonomous vehicle to perform the determined operation in accordance with the time series of control inputs.

15. The method of claim 14 in which the maneuver comprises two or more lane changes.

16. The method of claim 14 in which the maneuver comprises changing speed.

17. The method of claim 14 in which the maneuver comprises bringing the autonomous vehicle to a stop at a place where a stop is permissible.

18. The method of claim 14 in which the maneuver comprises entering a shoulder of the road.

19. The method of claim 14 in which the maneuver comprises proceeding on a ramp.

20. The method of claim 14 in which the maneuver comprises a U-turn.

21. The method of claim 14 in which the maneuver comprises an emergency stop.

22. The method of claim 14 in which the determining of the operation of the autonomous vehicle to effect the command comprises determining that the manner of operation will not violate a rule of operation of the autonomous vehicle.

23. A method comprising:
receiving, by an autonomous vehicle, a command expressing an objective for operation of autonomous vehicle within a travel segment of a travel route, the objective spanning a time series of control inputs that are to be delivered to the autonomous vehicle;

determining an operation of the autonomous vehicle to effect the command, the operation comprising a candidate travel speed and a candidate travel lane of the travel segment associated with the time series of control inputs;

confirming that the operation will not violate a rule of operation of the autonomous vehicle;

generating the time series of control inputs for one or more actuators of the autonomous vehicle in accordance with the determined operation; and causing the autonomous vehicle to perform the determined operation in accordance with the time series of control inputs.

24. The method of claim 23 comprising, if the operation will violate a rule of operation of the autonomous vehicle, minimizing the extent of the violation of the rule or ruling out the violation entirely or applying a compromise strategy between enforcing the rules of operation or ignoring them.

25. The method of claim 23 in which the objective comprises a lane change.

26. A method comprising:

receiving, by an autonomous vehicle, a command in response to an operator activating a button located in the autonomous vehicle, the command expressing an objective for operation of autonomous vehicle within a travel segment of a travel route, the objective spanning a time series of control inputs that are to be delivered by a remote source to the autonomous vehicle;

determining an operation of the autonomous vehicle to effect the command, the operation comprising a candidate travel speed and a candidate travel lane of the travel segment associated with the time series of control inputs;

generating the time series of control inputs for one or more actuators of the autonomous vehicle in accordance with the determined operation; and causing the autonomous vehicle to perform the determined operation in accordance with the time series of control inputs to achieve the objective.

27. A method comprising:

receiving, by an autonomous vehicle, a command from a computer process expressing an objective for operation of autonomous vehicle within a travel segment of a travel route, the objective spanning a time series of control inputs that are to be delivered to the autonomous vehicle;

determining an operation of the vehicle to effect the command, the operation comprising a candidate travel speed and a candidate travel lane of the travel segment associated with the time series of control inputs;

generating the time series of control inputs for one or more actuators of the autonomous vehicle in accordance with the determined operation; and causing the autonomous vehicle to perform the determined operation in accordance with the time series of control inputs to achieve the objective.

28. The method of claim 27 in which the computer process is running in a location that is remote from the autonomous vehicle.

29. The method of claim 27 in which the computer process is running at the autonomous vehicle.

30. The method of claim 1 in which the denominated travel segment comprises a named or numbered highway, road, or street.

31. A method comprising displaying to a human operator or other passenger of an autonomous vehicle a representation of one or more optional objectives for operation of the autonomous vehicle within a travel segment of a travel route, each of the objectives spanning a time series of control inputs that are to be delivered to one or more actuators of the autonomous vehicle; and receiving from the human operator or other passenger a selection of one or more of the objectives;

forming one or more commands based on the selection, the commands being expressed to cause operation of the autonomous vehicle along the travel segment;

determining an operation of the autonomous vehicle to effect the one or more commands, the operation comprising a candidate travel speed and a candidate travel lane of the travel segment associated with the time series of control inputs;

generating a time series of control inputs for one or more actuators of the autonomous vehicle in accordance with the determined operation, and causing the autonomous vehicle to perform the determined operation in accordance with the time series of control inputs to achieve the objective.

32. The method of claim 31 in which the displayed representation comprises icons each representing one or more of the optional objectives.

33. The method of claim 31 in which the displayed representation comprises visual representations of the one or more optional objectives overlaid on a representation of at least a portion of the denominated travel segment.

34. The method of claim 31 in which the optional objectives are displayed on a head up display.

35. The method of claim 31 in which the optional objectives are displayed on a video display.

36. The method of claim 31 in which the optional objectives are displayed on a steering wheel.

37. The method of claim 14 in which the command is received from a human operator in the autonomous vehicle.

* * * * *